United States Patent
Stauffer et al.

(10) Patent No.: US 12,273,167 B2
(45) Date of Patent: Apr. 8, 2025

(54) THERMAL MANAGEMENT WITH ANTENNA MODULES

(71) Applicant: Google LLC, Mountain View, CA (US)

(72) Inventors: Erik Richard Stauffer, Sunnyvale, CA (US); Jibing Wang, San Jose, CA (US); Aamir Akram, San Jose, CA (US); Vijay L. Asrani, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/636,887

(22) PCT Filed: Aug. 31, 2020

(86) PCT No.: PCT/US2020/048711
§ 371 (c)(1),
(2) Date: Feb. 20, 2022

(87) PCT Pub. No.: WO2021/050311
PCT Pub. Date: Mar. 18, 2021

(65) Prior Publication Data
US 2022/0302970 A1 Sep. 22, 2022

Related U.S. Application Data

(60) Provisional application No. 62/900,445, filed on Sep. 13, 2019.

(51) Int. Cl.
*H04B 7/06* (2006.01)
*H04B 1/036* (2006.01)

(52) U.S. Cl.
CPC ........... *H04B 7/0608* (2013.01); *H04B 1/036* (2013.01)

(58) Field of Classification Search
CPC ...... H04B 7/0608; H04B 1/036; H01Q 1/241; H01Q 21/00
See application file for complete search history.

(56) References Cited

U.S. PATENT DOCUMENTS 10,193,602 B1 * 1/2019 Frydman ................ H04B 17/18
10,218,422 B2   2/2019 Raghavan et al.
(Continued)

FOREIGN PATENT DOCUMENTS

| CN | 107251444 A | 10/2017 |
| WO | 2018130115 | 7/2018 |
| WO | 2021050311 | 3/2021 |

OTHER PUBLICATIONS

3GPP TS 36.331 V15.5.0 (Mar. 2019).*
(Continued)

*Primary Examiner* — Zhitong Chen
(74) *Attorney, Agent, or Firm* — Colby Nipper PLLC

(57) ABSTRACT

A user equipment (UE) manages thermal levels of antenna modules with reference to a temperature threshold. The UE includes multiple antenna modules having a first antenna module and a second antenna module and at least one wireless transceiver coupled to the multiple antenna modules. The UE also includes a processor and memory system implementing an antenna module thermal manager. The manager is configured to obtain a first temperature indication corresponding to the first antenna module of the multiple antenna modules. The manager is also configured to perform a comparison of the first temperature indication to at least one temperature threshold. The manager is further configured to switch, based on the comparison, from using the first antenna module to using the second antenna module for wireless communication with the at least one wireless transceiver.

20 Claims, 13 Drawing Sheets

(56) References Cited

U.S. PATENT DOCUMENTS

| | | | | |
|---|---|---|---|---|
| 2011/0250926 | A1 | 10/2011 | Wietfeldt et al. | |
| 2014/0199952 | A1* | 7/2014 | Sandhu | H04B 17/13 |
| | | | | 455/91 |
| 2015/0133103 | A1* | 5/2015 | Lee | H04W 52/0254 |
| | | | | 455/418 |
| 2022/0173784 | A1* | 6/2022 | Gao | H04B 7/0874 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.4.0, Dec. 2018, 67 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 948 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, 933 pages.

"International Search Report and Written Opinion", Application No. PCT/US2020/048711, Dec. 17, 2020, 21 pages.

"Invitation to Pay Additional Fees", Application No. PCT/US2020/048711, Oct. 26, 2020, 13 pages.

"UE Overheating for EN-DC", 3GPP R2-1802414, UE overheating for EN-DC, in 3GPP TSG-RAN WG2 Meeting #101, Apple Inc., Mar. 2, 2018, 3 pages.

"Universal Mobile Telecommunications System (UMTS); LTE; 5G; NR; Multi-connectivity; Overall description; Stage-2 (3GPP TS 37.340 version 15.5.0 Release 15)", ETSI TS 137 340 v15.5.0 (May 2019), May 2019, 70 pages.

Huo, et al., "5G Cellular User Equipment: From Theory to Practical Hardware Design", Jul. 2017, 18 pages.

Wu, "Handling Overheating in a Wireless-Communication Device", Technical Disclosure Commons; Retrieved from https://www.tdcommons.org/dpubs_series/2343, Jul. 12, 2019, 22 pages.

"International Preliminary Report on Patentability", Application No. PCT/US2020/048711, Mar. 15, 2022, 14 pages.

"Foreign Office Action", EP Application No. 20771410.6, Oct. 10, 2024, 7 pages.

"Foreign Office Action", CN Application No. 202080062303.X, Jan. 25, 2025, 16 pages.

* cited by examiner

THERMAL MANAGEMENT WITH ANTENNA MODULES

RELATED APPLICATION(S)

This application is a national stage entry of International Application No. PCT/US2020/048711, filed Aug. 31, 2020, which in turn claims priority to U.S. Provisional Application 62/900,445, filed Sep. 13, 2019, the disclosures of which are incorporated herein by reference in their entireties.

BACKGROUND

With cellular and some other wireless communication technologies, a communication between two endpoints usually has both a wireless portion and a wired portion. A portion of the communication that is near one party at one endpoint (e.g., a wireless device or "smartphone") is instituted using a wireless connection between the wireless device and a base station, which is part of a cellular or other radio access network of a larger communication network. This wireless connection typically extends from a few feet to a few miles. The larger communication network includes or is coupled to a wired network. The base station can therefore forward a wired portion of the communication using a wired connection over the wired network. The wired network can extend from dozens of feet to thousands of miles. If another party at another endpoint of the communication is also using a wireless device, the communication can be converted to another wireless portion and routed to the other party using another wireless connection.

Generally, such communications can enable voice, text, image, video, and data exchanges between two devices, as well as the provision of mobile services. To enable these communications over a wireless connection, wireless networks are already expected to handle immense quantities of data with little to no appreciable delay. However, newer services are primed to demand even more from cellular and other wireless networks. Users will expect greater data bandwidth and even less delay, which is called latency, to accommodate mobile services. These newer services include high-bandwidth applications like ultra-high definition (UHD) video that is delivered wirelessly from a streaming video service to a mobile device. Such services also include low-latency applications like autonomous-driving vehicles that communicate with each other to avoid accidents and that can therefore operate more safely if the vehicles are provided nearly instantaneous data communication capabilities. Some applications, like virtual reality (VR), will demand a combination of both high-bandwidth and low-latency data delivery. Further, there is the ongoing development of the Internet of Things (IoT), which involves providing wireless communication capabilities to everything from medical devices to security hardware, from refrigerators to speakers, and to nearly ubiquitous sensors designed for safety and convenience. The deployment of IoT devices means hundreds of billions of new devices will soon be trying to communicate wirelessly, and these IoT devices may have form factors that are smaller than those of smartphones.

Current Fourth Generation (4G) wireless networks are not expected to handle the data bandwidth and latency targets for these new applications or the tremendous quantity of new devices. Accordingly, to enjoy these new applications, new wireless technology is being developed. For example, Fifth Generation (5G) wireless network technology will adopt higher-frequency electromagnetic (EM) waves (e.g., 6 gigahertz (GHz) to 300 GHz and some "Sub-6 GHz" frequency ranges) to attain higher data bandwidth in conjunction with lower latency. These new applications and higher EM frequencies, however, introduce new and different challenges that are yet to be overcome by current wireless technologies.

For example, with the multitude of IoT devices that are coming online, the EM spectrum that is allocated to cellular wireless usage will be shared among many more wireless connection endpoints. Also, the millimeter wave (mmW) EM signals that will be used in some wireless networks, including many 5G cellular networks, attenuate more quickly than EM signals located in lower-frequency bands. More specifically, mmW EM signals experience degradation more quickly due to air molecules and other environmental factors, such as humidity or physical obstructions, as compared to the lower frequencies used in earlier generations of wireless networks. Consequently, mmW EM signals are incapable of traveling as far through the atmosphere before their quality is reduced to a level at which the information in the wireless signal is lost or otherwise becomes unusable. To address these issues, engineers and wireless-equipment designers are striving to create new wireless network technologies that can enable utilization of these higher GHz frequencies while also supporting many additional wireless devices in a cellular or other wireless network, including those operating in accordance with a 5G wireless standard.

This Background section is provided to generally present the context of the disclosure. Unless otherwise indicated herein, material described in this section is neither expressly nor impliedly admitted to be prior art to the present disclosure or the appended claims.

SUMMARY

This Summary section is provided to introduce simplified concepts of thermal management with antenna modules. These simplified concepts are further described below in the Detailed Description. Accordingly, this section is not intended to identify essential features of the claimed subject matter nor is it intended for use in determining the scope of the claimed subject matter.

With relatively-lower frequencies (e.g., below 3 gigahertz (GHz)), like those used in Fourth Generation (4G) wireless networks, wireless signals can propagate through many types of walls and have a relatively greater capacity to travel over distances in free space. This enables wireless signals in 4G systems to be transmitted omnidirectionally from a user equipment (UE) or another device. It also means that a UE may be able to use any of multiple included antennas to reach a base station (BS) with a satisfactory signal-to-noise ratio (SNR) while transmitting at an acceptable power level (e.g., without using too much power). Consequently, if operation of one antenna of a UE were to be temporarily terminated due to thermal concerns, another antenna of the UE is likely to be capable of handling wireless communications with the BS.

In contrast, with relatively-higher frequencies (e.g., above 3 GHz, including frequencies in the mmW range), like those that are to be used in Fifth Generation (5G) and newer Wi-Fi wireless networks, wireless signals struggle to propagate through walls and have a relatively lower capacity to travel over distances in free space. As a result, many wireless signals in 5G systems are to be transmitted directionally using antenna beamforming. With antenna beamforming, an antenna array of a device can aim a signal beam in a targeted direction. The signal beam can travel farther and be emanated at a lower power level, even at higher frequencies, as compared to a wireless signal that is emanated omnidirectionally.

With directional transmission or reception using antenna beamforming, a UE may selectively employ an included antenna array based on an orientation of a housing of the UE relative to a destination or origin, such as a BS. For instance, a UE may select an antenna array that is physically positioned on a same side of a housing as the intended destination or origin of a signal beam. There may thus be occasions when one or two antenna arrays of multiple antenna arrays of a UE can reach a BS with a satisfactory signal-to-noise ratio (SNR) while transmitting at an acceptable power level. At such occasions, the other antenna arrays of the UE may be unable to continue an ongoing communication with the BS for some reason, such as power limitations. Consequently, if operation of a given antenna array of the UE were to be temporarily terminated due to thermal overheating concerns, another antenna array of the UE may be incapable of handling the communication responsibilities. Such a situation causes a break in a connection between the UE and the BS and a loss of a phone call or an undesirable delay in communicating data for video, navigational commands, and other services.

To address these issues, instead of waiting until a thermal limit is reached to terminate use of an antenna array, potential thermal boundaries are proactively handled, e.g., for communications at relatively-higher frequencies. At these relatively-higher frequencies (e.g., 3-300 GHz), wireless signals are communicated with signal beams using antenna arrays. In some environments, individual antenna arrays of multiple antenna arrays are incorporated into a UE as part of respective ones of multiple antenna modules. Each antenna module can include, for example, an antenna array with multiple antenna elements, at least one amplifier, one or more phase shifters, and so forth. Accordingly, in some implementations, each antenna module is treated as a monolithic whole for thermal management purposes. Thus, a temperature indication for the monolithic whole can correspond to an antenna module and may jointly represent multiple internal components thereof. Further, switching to or away from the antenna module, or temporarily ceasing transmission or reception with the antenna module, can be performed with respect to the whole antenna module. This technique is simpler and algorithmically more efficient than attempting to track temperatures of, and separately activate and deactivate, internal components of an antenna module.

In example implementations, potential thermal boundaries are proactively handled by establishing multiple temperature thresholds, which can be applied at a granularity of an antenna module. Before a temperature indication of an antenna module reaches a first temperature threshold, the temperature may be discounted for antenna selection purposes while other factors are considered or prioritized higher. Responsive to the temperature indication of the antenna module being between the first temperature threshold and a second temperature threshold, one or more temperature remediation processes can be executed to manage the temperature indication of the antenna module. Each temperature remediation process can lower, maintain, resist an increase to, or cap a value of the temperature of the antenna module as represented by the temperature indication. If the temperature indication of the antenna module meets the second temperature threshold, then usage of the antenna module can be temporarily ceased to provide time for the module to cool before damage or harm can occur. In these manners, temperatures of antenna modules can be proactively managed to increase a likelihood that a given antenna module is available for transmission or reception if an operational scenario or orientation of the UE housing causes other antenna modules to be unusable, including in a high-frequency beamforming environment. Thus, a probability that a communication is dropped or delayed due to thermal issues is reduced.

In some implementations, temperature remediation processes include those that proactively switch or split traffic of a wireless communication between two or more antenna modules to reduce heating. Example sharing techniques include time-aware approaches and throughput-based approaches. Other temperature remediation processes include those that utilize at least one channel quality indicator, such as an SNR measurement. Example channel-quality techniques include greedy approaches and priority-based approaches. In other implementations, a thermal profile is computed for each antenna module, and the thermal profile can be included in an algorithm used to execute a temperature remediation process. Other factors, such as a specific absorption rate (SAR) or a detected object, can be considered in conjunction with execution of the temperature remediation process. In these manners, various factors and techniques can be used to facilitate thermal management of antenna modules to increase a likelihood that at least one antenna module is available to aim a signal beam in a targeted direction at any given time.

In further example implementations, a UE and a BS can communicate with each other regarding thermal management with antenna modules. For example, the UE can transmit to the BS at least one wireless signal that is indicative of a switch from using a first antenna module to using a second antenna module for wireless communication with the BS. With this information, the BS can determine or aim a signal beam that is appropriate for communicating with the second antenna module, including by training beamforming parameters prior to a switch between two or more antenna modules of the UE. Further, the UE can include in the wireless signal an indication of a reason, such as thermal management, for the switch from using the first antenna module to using the second antenna module. With this information, the BS can prioritize antenna module switch requests from different UEs if network congestion results in conflicting requests. Accordingly, the BS can transmit a responsive antenna module message to the UE. Alternately or additionally, the BS can generate, or change to, a different signal beam at the BS to facilitate the antenna module switch at the UE.

Aspects described below include a user equipment for thermal management with antenna modules. The user equipment includes multiple antenna modules having a first antenna module and a second antenna module, at least one wireless transceiver coupled to the multiple antenna modules, and a processor and memory system. The processor and memory system are coupled to the at least one wireless transceiver and implement an antenna module thermal manager. The antenna module thermal manager is configured to obtain a first temperature indication corresponding to the first antenna module of the multiple antenna modules. The antenna module thermal manager is also configured to perform a comparison of the first temperature indication to at least one temperature threshold. The antenna module thermal manager is further configured to switch, based on the comparison, from using the first antenna module to using the second antenna module for wireless communication with the at least one wireless transceiver.

Aspects described below include a method performed by a user equipment for thermal management with antenna modules. The method includes obtaining a first temperature indication corresponding to a first antenna module of multiple antenna modules of the user equipment, with the multiple antenna modules including a second antenna module. The method also includes performing a comparison of the first temperature indication to at least one temperature threshold. The method further includes switching, based on the comparison, from using the first antenna module to using the second antenna module for wireless communication with a base station.

Aspects described below include a base station for thermal management with antenna modules. The base station includes at least one antenna array, one or more wireless transceivers coupled to the at least one antenna array, and a processor and memory system. The processor and memory system is coupled to the one or more wireless transceivers and implements an antenna module thermal manager that is configured to direct the one or more wireless transceivers. The antenna module thermal manager is configured to communicate, using the at least one antenna array, with a user equipment via a first antenna module of the user equipment. The antenna module thermal manager is also configured to receive at least one wireless signal from the user equipment, with the at least one wireless signal being indicative of a switch from using the first antenna module to using a second antenna module of the user equipment for wireless communication between the user equipment and the base station. Here, the at least one wireless signal is also indicative of a reason for the switch. The antenna module thermal manager is further configured to communicate, responsive to the at least one wireless signal and using the at least one antenna array, with the user equipment via the second antenna module of the user equipment.

Aspects described below include a method performed by a base station for thermal management with antenna modules. The method includes communicating, using the at least one antenna array, with a user equipment via a first antenna module of the user equipment. The method also includes receiving at least one wireless signal from the user equipment, with the at least one wireless signal indicative of a switch from using the first antenna module to using a second antenna module of the user equipment for wireless communication between the user equipment and the base station. Here, the at least one wireless signal is also indicative of a reason for the switch. The method further includes communicating, responsive to the at least one wireless signal and using the at least one antenna array, with the user equipment via the second antenna module of the user equipment.

Aspects described below further include a system that may be realized as at least part of a user equipment. The system includes means for thermally managing multiple antenna modules of the user equipment. The means for thermally managing is configured to obtain a first temperature indication corresponding to a first antenna module of multiple antenna modules of the user equipment, with the multiple antenna modules including a second antenna module. The means for thermally managing is also configured to perform a comparison of the first temperature indication to at least one temperature threshold. The means for thermally managing is further configured to switch, based on the comparison, from using the first antenna module to using the second antenna module for wireless communication with a base station.

BRIEF DESCRIPTION OF THE DRAWINGS

Apparatuses of and techniques for thermal management with antenna modules are described with reference to the following drawings. The same numbers are used throughout the drawings to reference like features and components.

DETAILED DESCRIPTION

Overview

Figure 1:
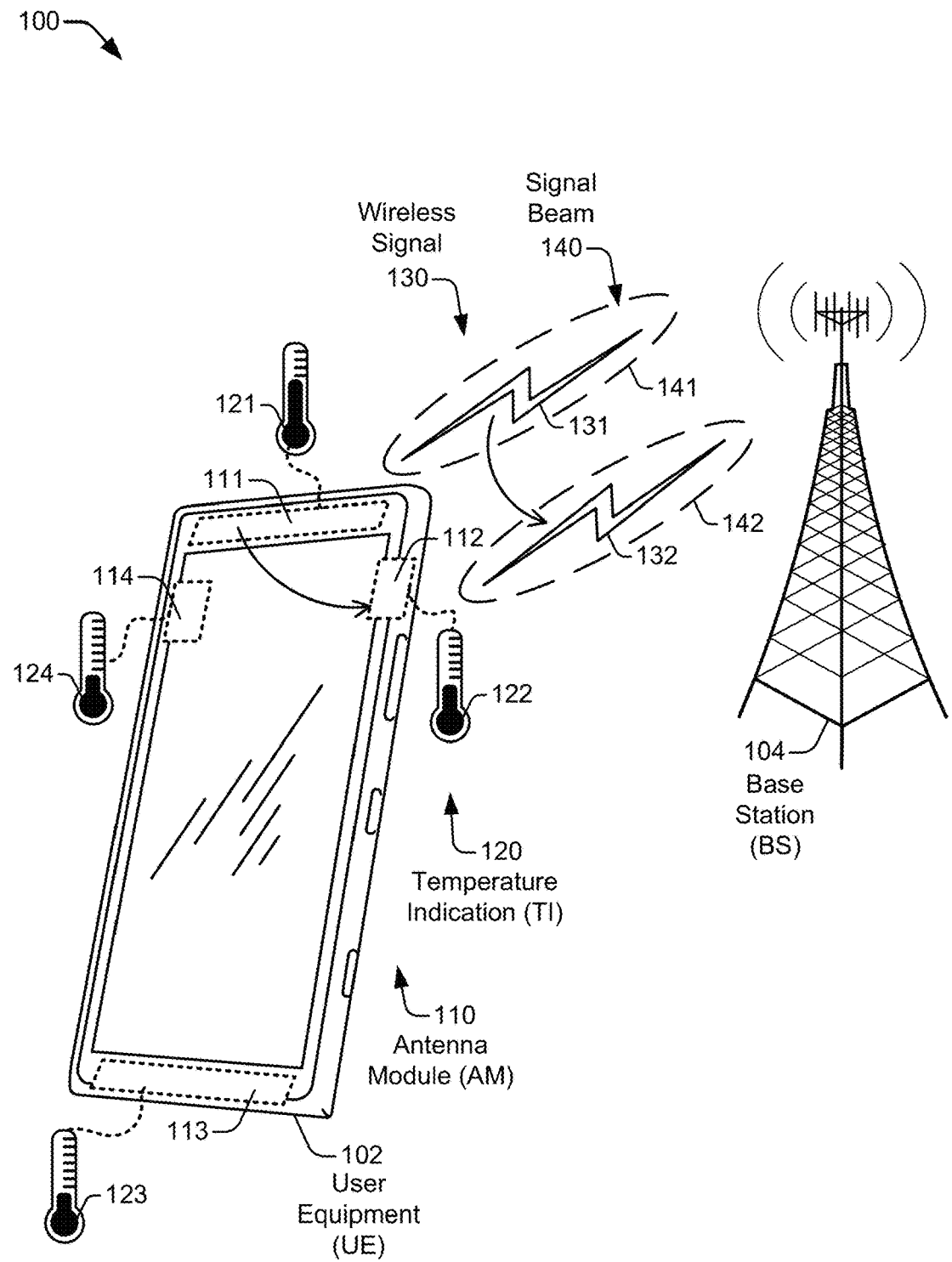
FIG. 1 illustrates an example wireless network environment in which a user equipment (UE) and a base station (BS) can individually or jointly implement thermal management with antenna modules.

Today, users can watch high-definition (HD) video, monitor social-network feeds, and participate in video conferencing using cellular wireless networks that operate in accordance with a Fourth Generation (4G) standard, such as Long-Term Evolution (LTE) or LTE-Advanced. Soon, cellular wireless networks will be asked to handle newer applications that are technologically more difficult to provide to end users. Such applications may include watching ultra-HD (UHD) video or wirelessly coupling hundreds of billions more communication endpoints—many of which will have compact form factors—to the internet to support Internet-of-Things (IoT) devices. Such applications may also entail providing a safer usage of the roadways by empowering self-driving vehicles or exchanging three-dimensional (3D) virtual reality (VR) data for games, professional training, and educational activities. To enable these newer applications, current cellular wireless networks are expected to be upgraded from 4G technology.

To upgrade from current 4G wireless networks, various goals have been established for next-generation Fifth Generation (5G) networks. These goals involve adopting higher electromagnetic (EM) frequencies for wireless signaling in 5G networks as compared to those that are used in 4G networks. For example, instead of only operating in the 100s of megahertz (MHz) to a few gigahertz (GHz) like with 4G networks, 5G networks are expected to also operate above 3 GHz and into the 10s of GHz (e.g., from about 6 GHz to 300 GHz for mmW signaling). These higher frequencies offer some advantages, such as the potential for greater communication bandwidth in conjunction with lower latency. However, there are many challenges to working with these higher frequencies, and the increase in numbers of wireless devices will further tax wireless network resources.

With relatively-lower frequencies (e.g., below 3 GHz), like those used in 4G wireless networks, wireless signals can propagate through many types of walls and have a relatively greater capacity to travel over distances in free space. This enables wireless signals in 4G systems to be transmitted omnidirectionally, such as from a user equipment (UE) in all directions "toward" a base station (BS). It also means that the UE may be able to use any of multiple included antennas to reach the BS with a satisfactory signal-to-noise ratio (SNR) while transmitting at an acceptable power level that efficiently utilizes an onboard battery. Consequently, if operation of one antenna of the UE were to be temporarily terminated due to thermal concerns, another antenna of the UE is likely to be capable of continuing wireless communications with the BS while using relatively-lower frequencies.

In contrast, with relatively-higher frequencies (e.g., above 3 GHz, including frequencies in the mmW range), like those that are to be used in 5G wireless networks and newer Wi-Fi networks, wireless signals struggle to propagate through walls and have a relatively lower capacity to travel over distances in free space. As a result, many wireless signals in 5G systems and faster Wi-Fi networks are to be transmitted directionally using antenna beamforming. With antenna beamforming, an antenna array of a device can aim a signal beam in a targeted direction. The signal beam can travel farther and be emanated at a lower power level, even at higher frequencies, as compared to a wireless signal that is emanated omnidirectionally.

With directional transmission or reception using antenna beamforming, a UE may selectively employ an included antenna array based on orientation of a housing of the UE relative to a targeted destination or origin, such as a BS. For instance, a UE may select an antenna array that is physically positioned on a same side of a housing as the intended destination or origin of a signal beam. There may thus be occasions when one or two antenna arrays of multiple antenna arrays of a UE can reach a BS with a satisfactory SNR while transmitting at an acceptable power level. At such occasions, the other antenna arrays of the UE may be unable to continue an ongoing communication with the BS due to beamforming constraints, spatial orientation of the UE, or another factor. Consequently, if operation of a given antenna array of the UE were to be temporarily terminated due to thermal overheating concerns, another antenna array of the UE may be incapable of handling the communication responsibilities. Such a situation causes a break in a connection between the UE and the BS and a loss of a phone call or an undesirable delay in communicating data for video, navigational commands, and other services.

To address these issues as described herein, instead of waiting until a thermal limit is reached to terminate use of an antenna array, potential thermal boundaries are proactively handled, e.g., for communications at relatively-higher frequencies. At these relatively-higher frequencies (e.g., 3-300 GHz), wireless signals can be efficiently communicated with signal beams using antenna arrays. In some environments, individual antenna arrays of multiple antenna arrays are incorporated into a UE as part of respective ones of multiple antenna modules. Examples of a UE that includes multiple antenna modules (AMs) along with other components are described below with reference to FIGS. 1, 3, and 4. Each antenna module can include, for example, an antenna array with multiple antenna elements, at least one amplifier, at least one phase shifter per antenna element, and so forth. Accordingly, in some implementations, each antenna module is treated as a monolithic whole for thermal management purposes. For instance, a temperature indication (TI) can correspond to an antenna module (AM) and may jointly represent the thermal conditions of multiple internal components thereof.

Further, switching to or away from an antenna module, or temporarily ceasing transmission or reception with the antenna module, can be performed with respect to the whole antenna module. This technique is simpler and algorithmically more efficient than attempting to track temperatures of, and separately activate and deactivate, internal components of an antenna module. The processes, schemes, and techniques described herein can be implemented by an antenna module thermal manager, which is described with reference to FIGS. 2, 4, and 5. The antenna module thermal manager can consider multiple factors, in addition to at least one temperature indication of one or more antenna modules, to determine an antenna module for use. Example factors are described below with reference to FIG. 5.

In example implementations, an antenna module thermal manager proactively handles potential thermal boundaries by establishing multiple temperature thresholds. Before a temperature indication of an antenna module reaches (e.g., equals or exceeds—as the temperature is increasing) a first temperature threshold, the antenna module thermal manager may discount the temperature indication for antenna selection purposes while other factors are considered or prioritized. Responsive to the temperature indication of the antenna module being between the first temperature threshold and a second temperature threshold, the antenna module thermal manager can execute one or more temperature remediation processes to manage the temperature indication. Each temperature remediation process can lower, maintain, resist an increase to, or cap a value of the temperature of the antenna module as represented by the temperature indication. If the temperature indication of the antenna module meets (e.g., equals or exceed—as the temperature is increasing) the second temperature threshold, then the antenna module thermal manager can temporarily cease usage of the antenna module to provide time for the module to cool before damage or harm can occur. Multiple temperature thresholds are described below with reference to FIG. 6. Using multiple temperature thresholds and at least one temperature remediation process, temperatures of antenna modules can be proactively managed to increase a likelihood that a given antenna module is available for transmission or reception if an operational scenario or orientation of the UE housing causes other antenna modules to be unusable, including in a high-frequency beamforming environment. Thus, a probability that a communication is dropped or delayed due to thermal issues is reduced.

In some example implementations, temperature remediation processes include those that proactively switch or split traffic of a wireless communication between two or more antenna modules to reduce heating. Example sharing techniques include time-aware approaches and throughput-based approaches. Examples of these sharing-based techniques are described below with reference to FIG. 7. Other temperature remediation processes include those that utilize at least one channel quality indicator, such as an SNR measurement. Example channel-quality techniques include greedy approaches and priority-based approaches. Examples of these channel-quality-based techniques are described below with reference to FIG. 8.

In other example implementations, a thermal profile is computed for each antenna module, and the thermal profile can be included in an algorithm used to execute a temperature remediation process. A thermal profile can be computed, for instance, to model a rate of heat generation or dissipation over time. Examples of thermal-profile-based techniques are described below with reference to FIG. 9. Other factors, such as a specific absorption rate (SAR) or a detected object, can be considered in conjunction with execution of the temperature remediation process. In these manners, various factors and techniques can be used to facilitate thermal management of antenna modules to increase a likelihood that at least one antenna module is available to aim a signal beam in a targeted direction at any given time.

In further example implementations, a UE and a BS can communicate with each other regarding thermal management with antenna modules. For example, under the direction of an antenna module thermal manager, the UE can transmit to the BS at least one wireless signal that is indicative of a switch from using a first antenna module to using a second antenna module for wireless communication with the BS. With this information, the BS can determine or aim a signal beam that is appropriate for communicating with the second antenna module, including by training beamforming parameters prior to a switch between two or more antenna modules at the UE. Further, the UE can include in the wireless signal an indication of a reason, such as thermal management or SAR, for a switch from using the first antenna module to using the second antenna module. With this information, the BS can prioritize antenna module switch requests from different UEs if network congestion results in conflicting requests. Accordingly, the BS can transmit a responsive antenna module message to the UE. Alternately or additionally, the BS can generate, or change to, a different signal beam at the BS to facilitate the antenna module switch at the UE. Examples of these communications between a UE and a BS are described below with reference to FIGS. 10, 12, and 13.

Example implementations in various levels of detail are discussed below with reference to the associated figures. The discussion below first sets forth an example operating environment and then describes example hardware, schemes, and techniques. Example methods are described thereafter with reference to various flow diagrams.

Example Environment

FIG. 1 illustrates an example wireless network environment 100 in which a user equipment 102 (UE 102) and a base station 104 (BS 104) can individually or jointly implement thermal management with antenna modules. In this example, the UE 102 is depicted as a smartphone. However, the UE 102 may be implemented as any suitable computing or electronic device, such as a mobile communication device, modem, cellular or mobile phone, mobile station, gaming device, navigation device, media or entertainment device, laptop computer, desktop computer, tablet computer, smart appliance, vehicle-based communication system, wearable computer, Internet of Things (IoTs) device, wireless interface for a machine, and the like. The BS 104 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof. Further, the BS 104 may be implemented as an access point (AP) of a Wi-Fi network.

The BS 104 communicates with the UE 102 using at least one wireless signal 130, which may be implemented as any suitable type of wireless link. A wireless signal 130 can include a downlink (DL) of data and control information communicated from the BS 104 to the UE 102, an uplink (UL) of other data and control information communicated from the UE 102 to the BS 104, or both. The at least one wireless signal 130 may include one or more wireless links or bearers implemented using any suitable communication protocol or standard, or combination of communication protocols or standards, such as 3rd Generation Partnership Project Long-Term Evolution (3GPP LTE), Fifth Generation New Radio (5G NR), IEEE 802.11ac/ax, Wi-Fi 6, and so forth.

In some aspects, the UE 102 communicates with the BS 104 using at least one wireless signal 130, such as a first wireless signal 131, a second wireless signal 132, or both first and second wireless signals 131 and 132. The multiple wireless signals 131 and 132 may be communicated at a same time or at different times. Although two wireless signals 131 and 132 are explicitly depicted, the UE 102 and the BS 104 may communicate with more than two of such wireless signals 130. The UE 102 may communicate (e.g., transmit or receive) a given wireless signal 130 using at least one signal beam 140. As shown, the UE 102 communicates the first wireless signal 131 using a first signal beam 141 and the second wireless signal 132 using a second signal beam 142. More specifically, the first antenna module 111 can emanate or sense the first wireless signal 131 using the first signal beam 141. Similarly, the second antenna module 112 can emanate or sense the second wireless signal 132 using the second signal beam 142. The UE 102 may alternatively communicate wireless signals 130, 131, or 132 with a different quantity of signal beams.

Also, the first wireless signal 131 may be implemented using a same communication protocol or standard as, or a different communication protocol or standard than, that of the second wireless signal 132. For example, the first wireless signal 131 can be implemented using a 5G NR link while the second wireless signal 132 is implemented using an LTE link, or both can be implemented with respective Wi-Fi 6 links. For a cellular network, the BS 104 and any additional base stations collectively form a Radio Access Network (not shown), which is further connected using a core network to realize a wireless operator network. Using the Radio Access Network, the UE 102 may connect, via the core network, to one or more public networks (e.g., the Internet) or another packet data network to interact with a remote service. Such services may require, or at least benefit from, reliable communications with a high data rate and low latency. Example aspects of the UE 102 and the BS 104 are described below with reference to FIG. 2.

In example implementations, the UE 102 includes at least one antenna module 110 (AM 110). As shown, the UE 102 includes four antenna modules 111, 112, 113, and 114. However, a UE 102 may include more or fewer of such antenna modules 111-114. Generally, the antenna modules 111-114 are distributed around the UE 102 to enable signal beams to be aimed in various directions. However, antenna modules may be disposed at different positions than those illustrated in FIG. 1. Example aspects of an antenna module 110 are described below with reference to FIG. 4.

As illustrated, each antenna module 110 respectively corresponds to a temperature indication 120 (TI 120). Thus, a first antenna module 111 corresponds to a first temperature indication 121, and a second antenna module 112 corresponds to a second temperature indication 122. Also, a third antenna module 113 corresponds to a third temperature indication 123, and a fourth antenna module 114 corresponds to a fourth temperature indication 124. Determination of which antenna module 110 is to be used for a given wireless communication is at least partially made by an antenna module thermal manager based at least on a corresponding temperature indication 120. Examples of an antenna module thermal manager are described below with reference to FIGS. 2-4.

Example Wireless Devices for Thermal Management with Antenna Modules

Figure 2:
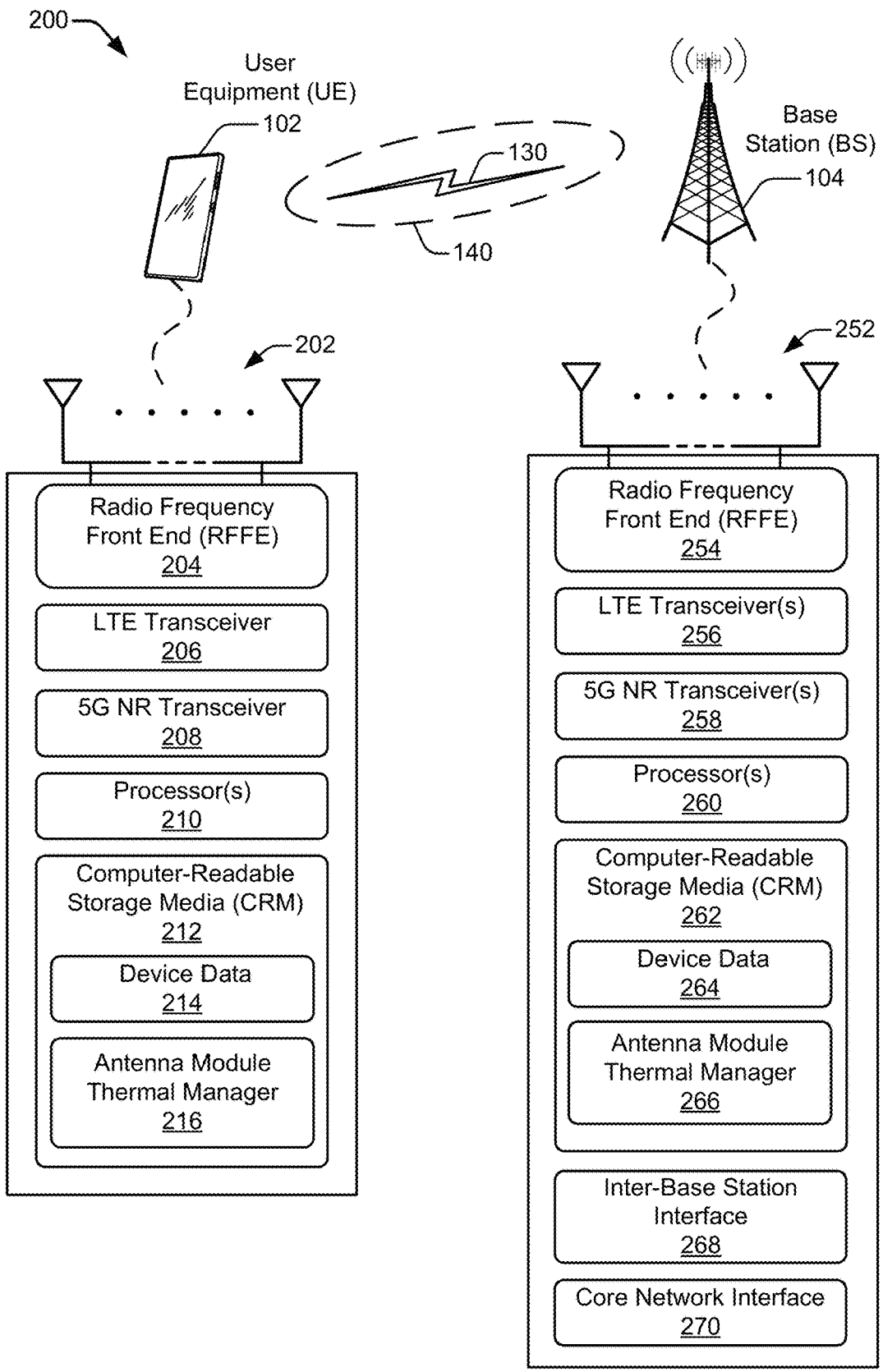
FIG. 2 is a schematic diagram illustrating various example components and aspects of two devices, a UE and a BS, that can implement thermal management with antenna modules.

FIG. 2 is a schematic diagram 200 illustrating various example components and aspects of two devices, a user equipment (UE) 102 and a base station (BS) 104, that can implement thermal management with antenna modules. The UE 102 and the BS 104 may include additional, components, functions, and interfaces that are omitted from FIG. 2 for the sake of clarity. The UE 102 includes antennas 202, at least one radio frequency front end 204 (RF front end 204 or RFFE 204), at least one LTE transceiver 206, and at least one 5G NR transceiver 208 for communicating with the BS 104. The RF front end 204 of the UE 102 can couple or connect the LTE transceiver 206 and the 5G NR transceiver 208 to the antennas 202 to facilitate various types of wireless communication. The antennas 202 of the UE 102 may include an array of multiple antennas that are configured similar to or differently from each other. The antennas 202 and the RF front end 204 can be tuned to, and/or be tunable to, one or more frequency bands defined by the 3GPP LTE or the 5G NR communication standards and implemented by the LTE transceiver 206 or the 5G NR transceiver 208, respectively.

Additionally, the antennas 202, the RF front end 204, the LTE transceiver 206, and/or the 5G NR transceiver 208 may be configured to support beamforming for the transmission and reception of wireless communications with the BS 104 and/or to enable multiple wireless connections to be at least substantially simultaneously established between the UE 102 and the BS 104. For instance, two wireless connections can be established using two different wireless transceivers that can be operated at a same time, or two wireless connections can be established using a single wireless transceiver that is operated in a time-division duplex (TDD) manner, such as interleaving their usage every other radio frame. Thus, the UE 102 can include multiple transceivers 206 and 208, such as at least one transceiver per simultaneous wireless connection. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards.

The UE 102 also includes one or more processors 210 and computer-readable storage media 212 (CRM 212). The processor 210 may be implemented as a single-core processor or as a multi-core processor composed of a variety of materials, such as silicon, polysilicon, high-K dielectric, copper, and so on. The computer-readable storage media 212 described herein excludes propagating signals. The CRM 212 may include any suitable memory or storage device, such as random-access memory (RAM), static RAM (SRAM), dynamic RAM (DRAM), non-volatile RAM (NVRAM), read-only memory (ROM), or Flash memory, useable to store device data 214 of the UE 102. The device data 214 includes user data, multimedia data, beamforming codebooks, applications, and/or an operating system of the UE 102. Applications (not explicitly shown) and the device data 214 are executable by the processor(s) 210 to enable user-plane communication, control-plane signaling, and user interaction with the UE 102.

The CRM 212 also includes an antenna module thermal manager 216. Alternately or additionally, the antenna module thermal manager 216 may be implemented in whole or part as hardware logic or circuitry integrated with or separate from other components of the UE 102. In at least some aspects, the antenna module thermal manager 216 configures the RF front end 204, the LTE transceiver 206, and/or the 5G NR transceiver 208 to implement the techniques for antenna module thermal management as described herein with regard to UEs, possibly in conjunction with other components, such as a communications processor or modem or one or more antenna modules (e.g., of FIG. 3). For example, the antenna module thermal manager 216 can determine which antennas 202 are to be used for wireless communication with the BS 104 based at least on a temperature indication.

The BS 104, as shown in FIG. 2, can correspond to any of the example types of base stations set forth above or an equivalent thereof. The functionality of the BS 104 may be distributed across multiple network nodes or devices and may be distributed in any fashion suitable to perform the functions described herein. The BS 104 include antennas 252, at least one radio frequency front end 254 (RF front end 254 or RFFE 254), one or more LTE transceivers 256, and/or one or more 5G NR transceivers 258 for communicating with the UE 102. The RF front end 254 of the BS 104 can couple or connect the LTE transceivers 256 and the 5G NR transceivers 258 to the antennas 252 to facilitate various types of wireless communication. The antennas 252 of the BS 104 may include an array of multiple antennas that are configured similar to or differently from each other. The antennas 252 and the RF front end 254 can be tuned to, and/or be tunable to, one or more frequency bands defined by the 3GPP LTE and 5G NR communication standards and implemented by the LTE transceivers 256 and the 5G NR transceivers 258, respectively. Additionally, the antennas 252, the RF front end 254, the LTE transceivers 256, and/or the 5G NR transceivers 258 may be configured to support beamforming, such as massive multiple-input multiple-output (e.g., Massive-MIMO), for the transmission and reception of communication signals with the UE 102 or multiple UEs. These components may also be configured to support the switching of antenna modules by the UE 102 for thermal management purposes.

The BS 104 also includes one or more processors 260 and computer-readable storage media 262 (CRM 262). The processor 260 may be implemented as a single-core processor or as a multi-core processor composed of a variety of materials, such as silicon, polysilicon, high-K dielectric, copper, and so on. The CRM 262 may include any suitable memory or storage device, such as random-access memory (RAM), static RAM (SRAM), dynamic RAM (DRAM), non-volatile RAM (NVRAM), read-only memory (ROM), Flash memory, or disk-based memory, useable to store device data 264 of the BS 104. The device data 264 includes network scheduling data, radio resource management data, beamforming codebooks, applications, and/or an operating system of the BS 104. Applications (not explicitly shown) and the device data 264 are executable by the processors 260 to enable communication with the UE 102 and network-side components, such as a neighbor base station or a network function (NF) node.

The CRM 262 also includes an antenna module thermal manager 266. Alternately or additionally, the antenna module thermal manager 266 may be implemented in whole or part as hardware logic or circuitry integrated with or separate from other components of the BS 104. In at least some aspects, the antenna module thermal manager 266 configures the RF front end 254, the LTE transceivers 256, and/or the 5G NR transceivers 258 to implement the techniques for antenna module thermal management as described herein with regard to base stations, possibly in conjunction with other components, such as a communications processor or a modem. For example, the antenna module thermal manager 266 can handle wireless signals pertaining to switching antenna modules at a UE due to thermal management, including approving or rejecting a switch request via an antenna module message, or generating or updating a signal beam that is aimed at an antenna module to which the UE is switching.

The BS 104 also includes an inter-base station interface 268, such as an Xn and/or X2 interface. The inter-base station interface 268 can be used to exchange user-plane and control-plane data with another base station to manage communications between the BS 104 and the UE 102 with respect to the other base station, such as for handovers or cooperative bandwidth delivery (e.g., over multiple wireless connections). The BS 104 further includes a core network interface 270 to exchange user-plane and control-plane data with functions and entities of a core network, such as an Evolved Packet Core (EPC) network or a 5G core network.

Figure 3:
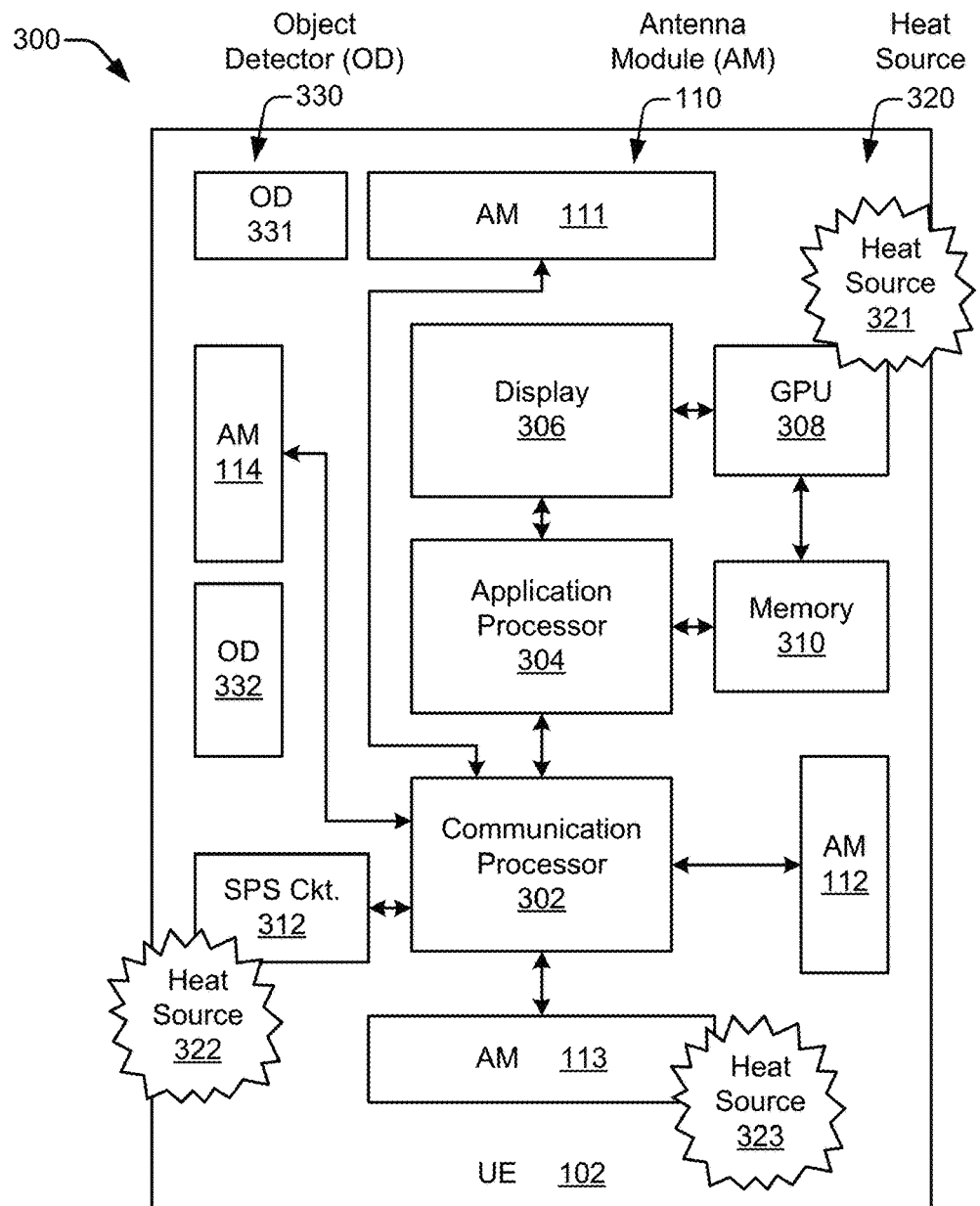
FIG. 3 is a schematic diagram illustrating an example UE with multiple components, including multiple antenna modules that are coupled to a communication processor.
Figure 3:
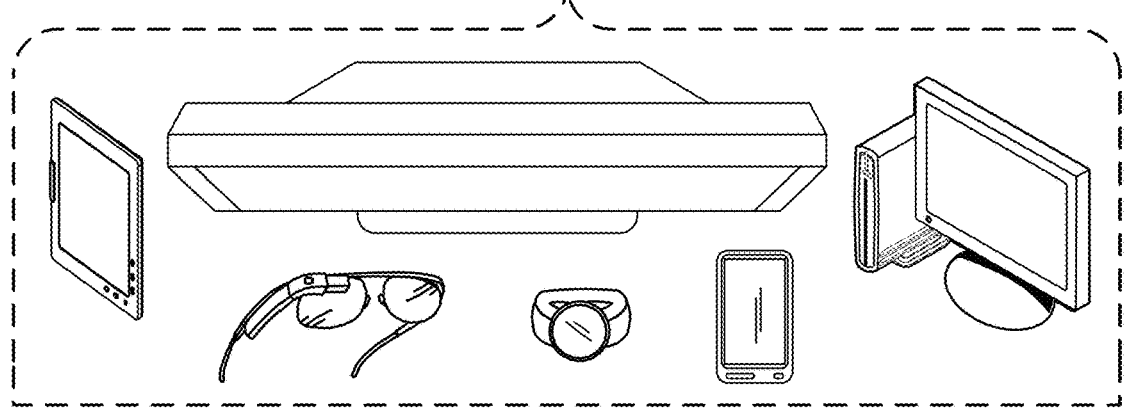

FIG. 3 is a schematic diagram illustrating an example UE layout 300 of a UE 102 with multiple components, including multiple antenna modules 111-114 that are coupled to at least one communication processor 302. As illustrated, the UE layout 300 also includes at least one application processor 304, at least one display 306, at least one graphics processing unit 308 (GPU 308), at least one memory 310, and at least one satellite-positioning system (SPS) circuit 312 (SPS ckt. 312). The communication processor 302 can be realized as a modem, modem baseband, digital signal processor (DSP), and so forth. The SPS circuit 312 enables the device to operate with an SPS—also known as a global navigation satellite system (GNSS)—such as the Global Positioning System (GPS) or the Galileo system, for geospatial positioning and navigational functions. The SPS circuit 312 is coupled to the communication processor 302. Each component, including the multiple antenna modules 111-114, has a physical position relative to other components on the UE layout 300 with respect to each other and with reference to a motherboard, a frame, or a housing of the UE 102.

In example implementations, at least the application processor 304 is coupled to the communication processor 302 to facilitate wireless communication for one or more applications executing on the application processor 304. The application processor 304, the display 306, the GPU 308, and the memory 310 are coupled to one another directly or through a bus (not explicitly shown) or another intra-device communication path. With reference also to FIG. 2, the communication processor 302 can realize at least part of the LTE transceiver 206, the 5G NR transceiver 208, or both. Also, in addition to the antennas 202, the multiple antenna modules 111-114 can realize at least part of the RF front end 204 or at least part of at least one transceiver 206 or 208. The UE 102 also includes at least one object detector 330 (OD 330).

As shown, the UE 102 includes a first object detector 331 and a second object detector 332. Each object detector (OD) 330 can detect an object, such as a finger or facial part, using an optical sensor, a heat sensor, radar, and so forth. The object detector 330 may interoperate with a corresponding antenna module 110 or may operate separately. Although not indicated explicitly in FIG. 3 for clarity, each object detector 330 may be communicatively coupled to the communication processor 302. The communication processor 302 may use the first and second object detectors 331 and 332 to comport with applicable guidelines regarding a specific absorption rate (SAR) if an object is detected to be proximate to an antenna module 110. Although two object detectors 331 and 332 are depicted, a UE 102 may include more or fewer object detectors.

Multiple examples of a UE 102 are shown in FIG. 3. These examples include a television, a tablet computing device, a desktop computer, intelligent glasses, a smartwatch, and a smartphone. Other implementations for a UE 102 can alternatively be realized, such as a notebook computer, an entertainment appliance, a set top box (STB), an Internet-of-Things (IoT) device, a wireless interface device of a machine (e.g., a residential appliance or industrial equipment), and so forth.

In operation of the UE 102, different components may function as a heat source 320. Three example heat sources 321, 322, and 323 are explicitly depicted in FIG. 3. During transmission or reception with the third antenna module 113, for instance, the third antenna module 113 functions as a third heat source 323 to generate self-heating. However, the third antenna module 113 may experience heating caused by one or more other components based on relative physical positions of the antenna module with respect to a component that is functioning as a heat source 320. For example, if the SPS circuit 312 is obtaining a position fix, the SPS circuit 312 functions as a second heat source 322. The second heat source 322 can also increase a temperature of the third antenna module 113 due to their relative physical positions. As part of the thermal management of the third antenna module 113, this other-heating can be taken into consideration based on a currently-sensed temperature, as part of a thermal profile for the third antenna module 113 based on the SPS circuit 312 currently functioning, and so forth. As another example, the GPU 308 can function as a first heat source 321 that affects at least the first antenna module 111. These various heat sources 320 can be at least partially accounted for by sensing a temperature or otherwise obtaining a respective temperature indication for each respective antenna module 110.

Figure 4:
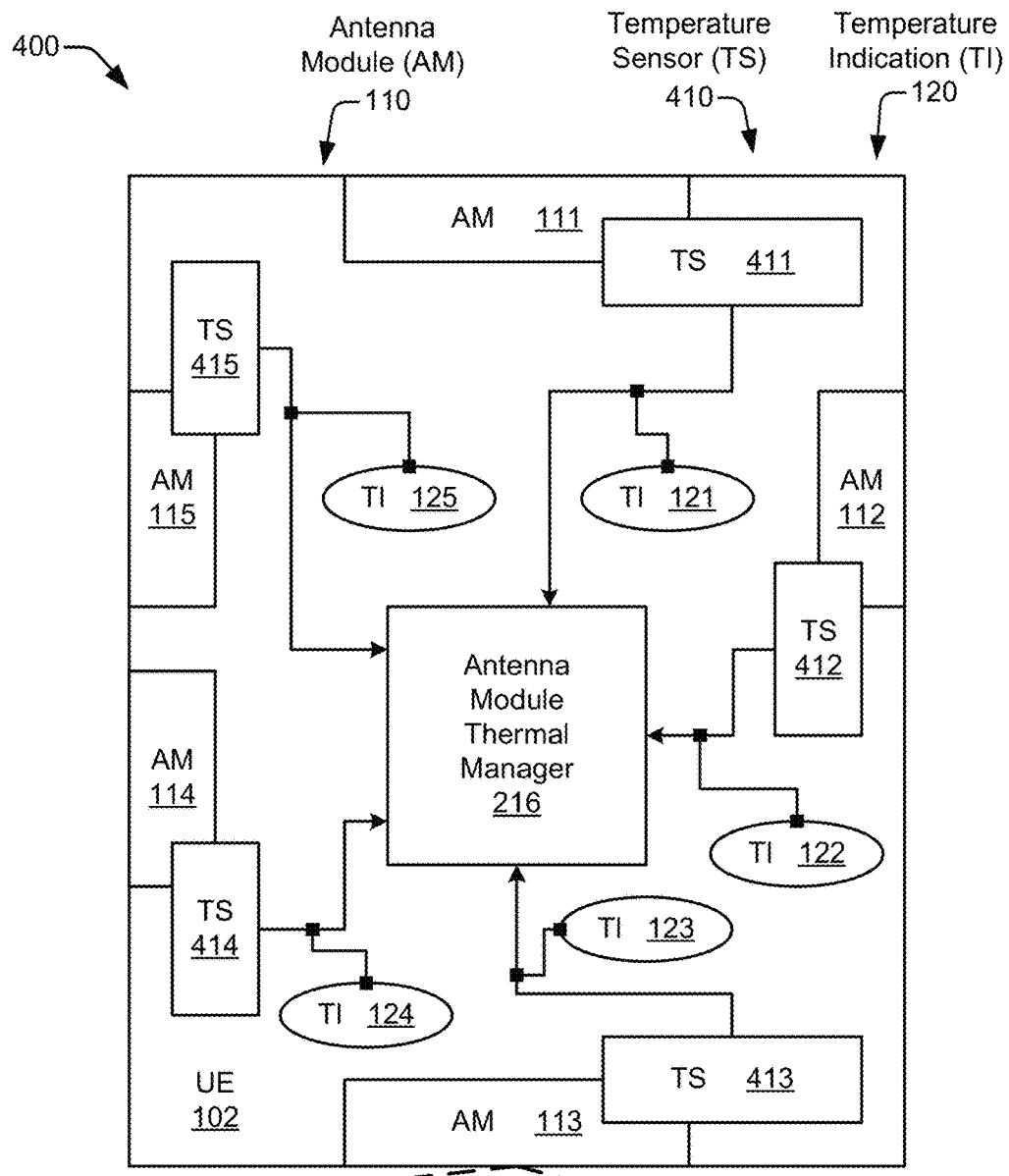
FIG. 4 is a schematic diagram illustrating an example UE with multiple antenna modules and multiple associated temperature sensors to obtain multiple respective temperature indications.
Figure 4:
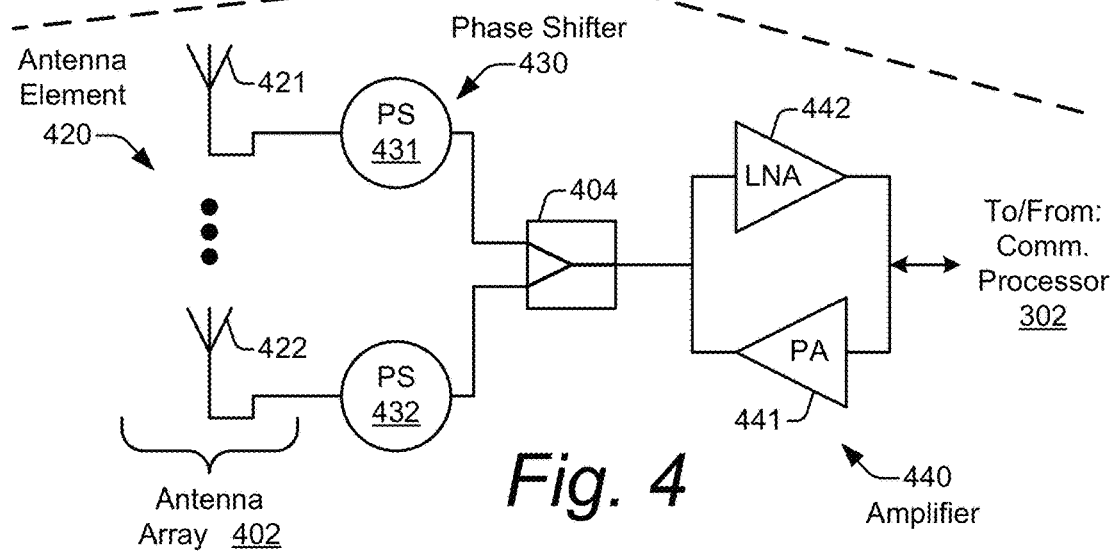

FIG. 4 is a schematic diagram 400 illustrating an example UE 102 with multiple antenna modules 111-115 and multiple temperature sensors 411-415. Each respective antenna module (AM) 110 is associated with a respective temperature sensor (TS) 410. More specifically, the first, second, and third antenna modules 111, 112, and 113 are respectively associated with first, second, and third temperature sensors 411, 412, and 413. Similarly, the fourth and fifth antenna modules 114 and 115 are respectively associated with fourth and fifth temperature sensors 414 and 415. Each temperature sensor 410 can be integrated, packaged, or otherwise incorporated into an associated antenna module 110. Alternately or additionally, a temperature sensor 410 can be separate from, but proximate to, an associated antenna module 110. For instance, a temperature sensor 410 can be sufficiently proximate to an antenna module 110 to obtain a temperature indication 120 (TI 120) that can represent a temperature of the associated antenna module 110. Each temperature sensor 410 can be implemented using a transistor, a thermistor, or other temperature-sensitive circuitry.

Each antenna module 110 can be realized in different manners. In some implementations, as depicted with reference to the third antenna module 113, each antenna module 110 includes at least one antenna array 402. The antenna array 402 includes multiple antenna elements 420 (e.g., two, four, five, eight, or more antenna elements), such as a first antenna element 421 and a second antenna element 422. An antenna 202 of the UE 102 (of FIG. 2) can correspond to an antenna element 420 or an antenna array 402. As shown, each antenna element 420 is respectively coupled to a phase shifter 430. Specifically, the first antenna element 421 is coupled to a first phase shifter 431, and the second antenna element 422 is coupled to a second phase shifter 432. The multiple phase shifters 430 are coupled to at least one signal coupler 404 which can function as a signal combiner for reception or a signal splitter for transmission.

The signal coupler 404 is coupled to at least one amplifier 440. Examples of the amplifier 440 include a power amplifier 441 (PA 441) for transmission and a low-noise amplifier 442 (LNA 442) for reception. The amplifier 440 is coupled to the communication processor 302 (of FIG. 3) to provide receive signals to and to accept transmit signals from the communication processor 302. A component chain realizing a given antenna module 110 may be ordered or connected differently and may include more, fewer, or different components. For example, at least one amplifier 440 may be associated with each antenna element 420, or the given antenna module 110 may include a mixer. If, for instance, a given antenna module 110 includes a mixer for frequency translation, the antenna module 110 can provide some of the functionality of a transceiver.

In example implementations, each of the temperature sensors 411-415 is coupled to the antenna module thermal manager 216. The antenna module thermal manager 216 can be at least partially implemented as part of, for example, the communication processor 302 (of FIG. 3), the application processor 304, the LTE transceiver 206 (of FIG. 2), the 5G NR transceiver 208, the one or more processors 210, and so forth. The antenna module thermal manager 216 can be localized at one component or distributed across multiple components.

In operation, each temperature sensor 410 provides a respective temperature indication 120 to the antenna module thermal manager 216. Thus, the first temperature sensor 411 provides the first temperature indication 121 to the antenna module thermal manager 216, and the second temperature sensor 412 provides the second temperature indication 122 to the antenna module thermal manager 216. Similarly, the third, fourth, and fifth temperature sensors 413, 414, and 415 respectively provide the third, fourth, and fifth temperature indications 123, 124, and 125 to the antenna module thermal manager 216. Each temperature indication 120 can be implemented as a voltage level, a current magnitude, a variable resistance, a digital value, and so forth. After accepting one or more temperature indications 120, the antenna module thermal manager 216 can perform a temperature remediation analysis for thermal management with antenna modules as described next with reference to FIG. 5.

Example Schemes and Techniques for Thermal Management with Antenna Modules

Figure 5:
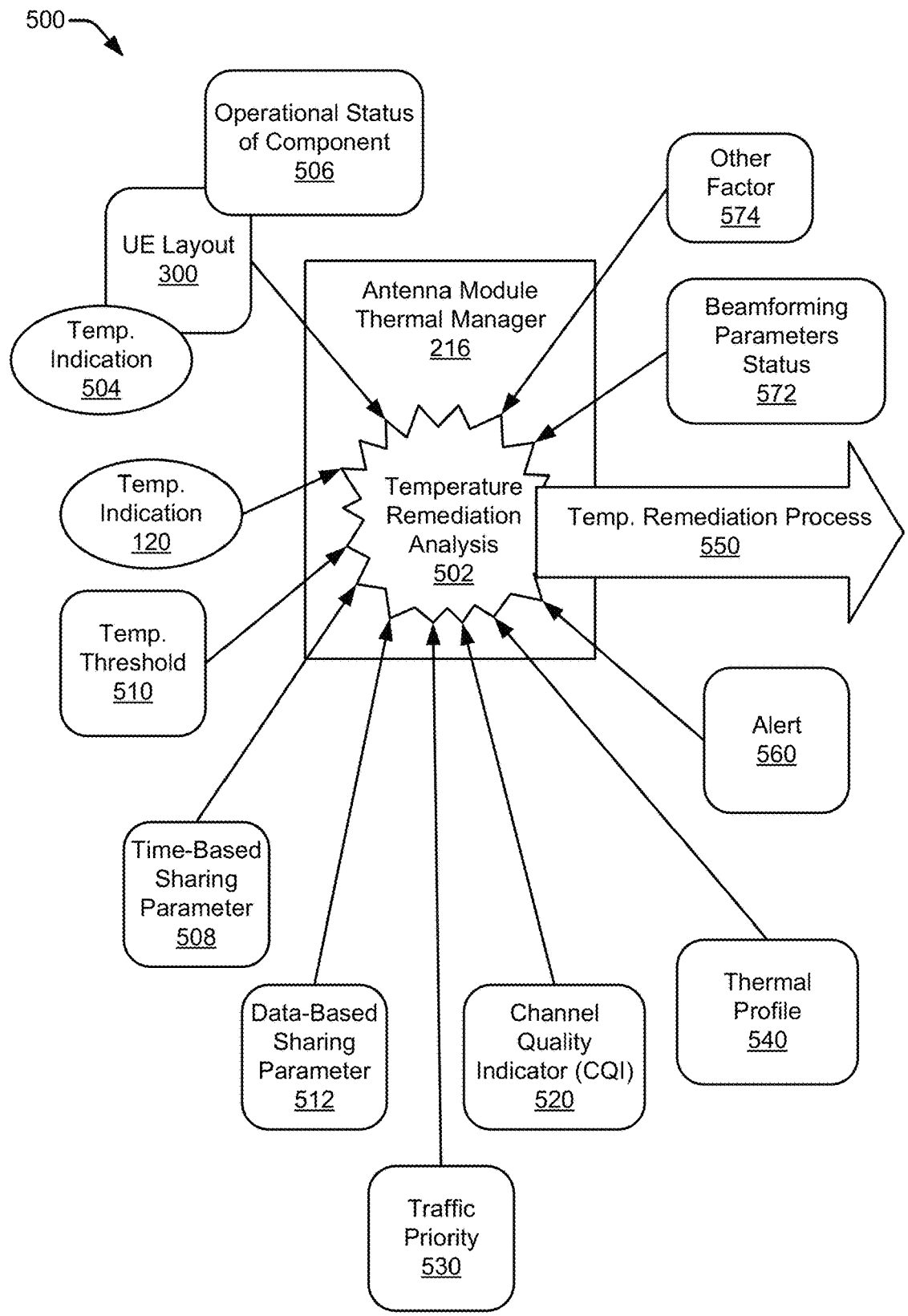
FIG. 5 depicts an example scheme including multiple factors, such as temperature indications and temperature thresholds, for thermal management with antenna modules.

FIG. 5 depicts an example scheme 500 including multiple factors, such as temperature indications 120 and a temperature threshold 510, for thermal management with antenna modules. In some implementations, the antenna module thermal manager 216 performs a temperature remediation analysis 502 to support a temperature remediation process 550, examples of which are described below. For instance, the antenna module thermal manager 216 can perform a temperature remediation analysis 502 that is based on at least one temperature threshold 510 and at least one temperature indication 120 that corresponds to at least one antenna module 110 (e.g., of FIG. 4). Further, the temperature remediation analysis 502 can be based on multiple temperature thresholds 510 that establish multiple operational modes. Examples of these techniques with multiple thresholds and operational modes are described below with reference to FIG. 6.

The temperature remediation analysis 502 can additionally or alternatively include other factors individually or in any combination with one or more other ones of the factors. For example, the antenna module thermal manager 216 can incorporate the UE layout 300 (as depicted in FIG. 3) into the temperature remediation analysis 502. To do so, the antenna module thermal manager 216 can consider one or more other heat sources 320 that are not generated by or based on antenna module operation. These other heat sources 320 can be factored into the temperature remediation analysis 502 using a temperature indication 504 obtained from a temperature sensor near a given component that is functioning as a heat source 320. These other heat sources 320 can also be included in the temperature remediation analysis 502 based on an operational status of a component 506 (e.g., a utilization rate of a component) or in other manners. The antenna module thermal manager 216 may also consider relative physical positions of two or more components as reflected by the UE layout 300.

In some implementations, other example factors include: a time-based sharing parameter 508, a data-based sharing parameter 512, a channel quality indicator 520 (CQI 520), a traffic priority 530, a thermal profile 540, at least one alert 560, beamforming parameters status 572, another factor 574, and so forth. Two sharing-related techniques are described below with reference to FIG. 7. The sharing-related techniques include a time-based approach that uses at least one time-based sharing parameter 508 (e.g., a duty cycle) and a data-based approach that uses at least one data-based sharing parameter 512. Techniques that are responsive to at least one channel quality indicator (CQI) 520, which may also be based on the traffic priority 530, are described below with reference to FIG. 8. Techniques that are based on a thermal profile 540 for an antenna module 110 are described with reference to FIG. 9. The thermal profile 540 can be generated for the antenna module 110 over time based on a rate of heat generation or heat dissipation.

An alert 560 factor can refer to any notification or determination of an environmental issue that effects antenna module selection. Examples of alerts include a detection by an object detector 330 (of FIG. 3) of an object that is proximate to an antenna module, reaching a SAR level with respect to an antenna module, and so forth. An alert 560 can serve as a factor to switch away from an antenna module 110 that is the subject of the alert 560. For instance, if an individual antenna module 110 is associated with a SAR alert 560 or a detected-object alert 560, the individual antenna module 110 can be excluded from consideration as a candidate to be actively transmitting or receiving.

Another factor that can affect selection of an antenna module for transmission or reception is a beamforming parameters status 572. Signal beam management or maintenance is conducted for beamforming communications, including for mmWave communications.

Depending on how long an antenna module has been inactive, the inactive antenna module may be operated briefly to maintain beamforming parameters at the UE or at the BS or to evaluate signal conditions at that antenna module. As represented by the other factor 574, the antenna module thermal manager 216 can consider other factors as part of a temperature remediation analysis 502 to support a temperature remediation process 550. Examples of temperature remediation processes 550 are described next with reference to FIGS. 6-9.

Figure 6:
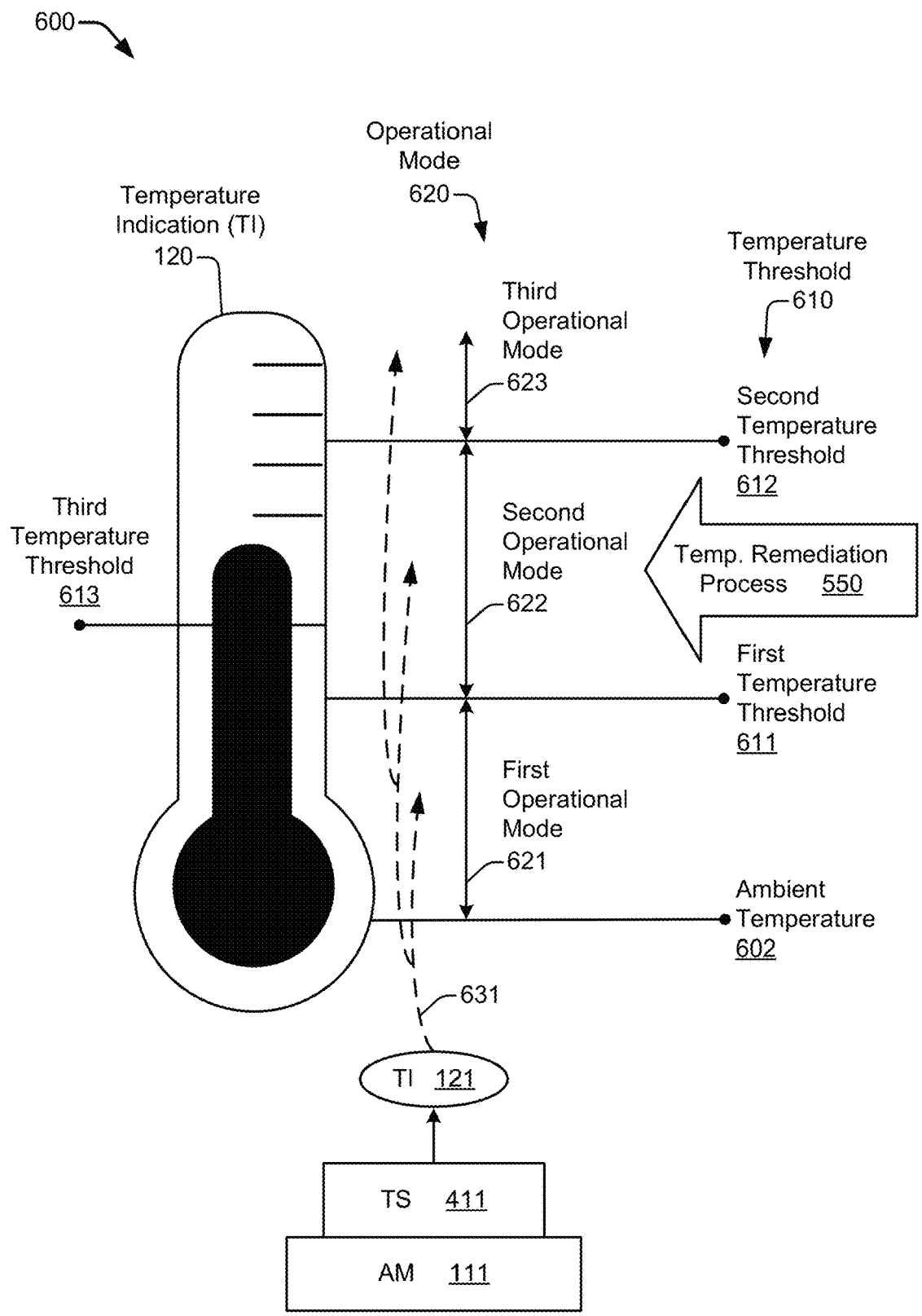
FIG. 6 illustrates examples of multiple temperature thresholds and multiple operational modes of one or more antenna modules for use with techniques to implement thermal management with antenna modules.

FIG. 6 illustrates multiple temperature thresholds 611-613 and multiple operational modes 621-623 of one or more antenna modules for example techniques 600 to implement thermal management with antenna modules. The principles are described relative to a first antenna module 111; however, such principles can be applied to other antenna modules, such as the second, third, fourth, and fifth antenna modules 112, 113, 114, and 115 (e.g., of FIG. 4). As shown, at least one temperature threshold 610 can include a first temperature threshold 611, a second temperature threshold 612, a third temperature threshold 613, and so forth. Although three temperature thresholds 610 are depicted, implementations may employ more or fewer temperature thresholds. FIG. 6 also depicts a level for an ambient temperature 602.

In example implementations, the first and second temperature thresholds 611 and 612 define multiple operational modes 620. In FIG. 6, the multiple operational modes 620 include a first operational mode 621, a second operational mode 622, and a third operational mode 623. Generally, these temperature thresholds 610 and operational modes 620 are utilized relative to a temperature indication 120. As shown, the first temperature sensor 411 senses the first temperature indication 121 corresponding to the first antenna module 111. Initially, upon powering up a UE, the first temperature indication 121 is approximately equal to the ambient temperature 602. During operation, a value of the first temperature indication 121 increases, as represented by the series of dashed arrows 631.

In example operations of the techniques 600, the first temperature indication 121 is compared to the first temperature threshold 611 and the second temperature threshold 612. Responsive to the first temperature indication 121 being below the first temperature threshold 611, the first antenna module 111 is operated in accordance with the first operational mode 621. In the first operational mode 621, antenna module selection may be determined without considering a temperature of the first antenna module 111. There is a possibility that due to infrequent use, a good cooling environment (e.g., strong airflow or another heat dispersing effect), or a low ambient temperature 602, the first antenna module 111 may not reach the first temperature threshold 611. In such scenarios, selection of antenna modules can discount the first temperature indication 121 corresponding to the first antenna module 111.

However, if the first temperature indication 121 continues to increase, the first temperature indication 121 reaches the first temperature threshold 611. To determine this, the antenna module thermal manager 216 (e.g., of FIGS. 4 and 5) can perform a comparison of the first temperature indication 121 to the first temperature threshold 611. Responsive to the first temperature indication 121 meeting (e.g., equaling or surpassing) the first temperature threshold 611, the first antenna module 111 can be operated in the second operational mode 622. In the second operational mode 622, the antenna module thermal manager 216 executes at least one temperature remediation process 550 to moderate the first temperature indication 121 corresponding to the first antenna module 111. To moderate the first temperature indication 121, the antenna module thermal manager 216 can, for example, implement one or more techniques to maintain, cap, lower, or reduce a rate of increase of a value of the first temperature indication 121. Example temperature moderation techniques are described below with reference to FIGS. 7-9.

Despite implementing at least one temperature remediation process 550, the first temperature indication 121 may continue to increase until meeting the second temperature threshold 612. Responsive to meeting the second temperature threshold 612, the antenna module thermal manager 216 can operate the first antenna module 111 in accordance with a third operational mode 623. For example, the antenna module thermal manager 216 can cease using the first antenna module 111 for wireless communication. The antenna module thermal manager 216 can cease using the first antenna module 111 for wireless transmission, for wireless reception, or for both wireless transmission and reception. After some time period, the first antenna module 111 can again be used for wireless communication. Alternately or additionally, use of the first antenna module 111 can resume after the first temperature indication 121 drops below the second temperature threshold 612 (e.g., by some margin to implement a hysteresis buffer zone to prevent oscillating around the second temperature threshold 612). Similarly, performance of a temperature remediation process 550 can be suspended if the first temperature indication 121 decreases below the first temperature threshold 611.

Although two temperature thresholds 611 and 612 and three operational zones 621-623 have been described above, more or fewer thresholds or operational zones can be implemented. For example, a third temperature threshold 613 can be employed. As shown, the third temperature threshold 613 can divide the second operational mode 622 into two parts or into two separate operational modes. Different types of temperature remediation processes 550 may be performed responsive to the first temperature indication 121 being below or above the third temperature threshold 613. For instance, more aggressive remediation processes that have a higher chance of adversely impacting wireless communication performance can be avoided until the first temperature indication 121 passes the third temperature threshold 613.

In some implementations, employing techniques with multiple operational modes 620 can gradually reduce usage of an antenna module 110 while the module is heating in an attempt to keep the antenna module 110 available for use to aim a signal beam in a particular direction. First, the antenna module thermal manager 216 can perform a comparison of the first temperature indication 121 to the first temperature threshold 611. Second, based on the comparison (e.g., if the first temperature indication 121 meets the first temperature threshold 611), the antenna module thermal manager 216 switches from using the first antenna module 111 to using a second antenna module 112 (e.g., of FIG. 4) for wireless communication in accordance with at least one temperature remediation process 550. Third, the antenna module thermal manager 216 can perform another comparison of the first temperature indication 121 to the second temperature threshold 612. Fourth, based on the other comparison, the antenna module thermal manager 216 can cease using the first antenna module 111 for the wireless communication for some time period. Thus, in the third operational mode 623, the antenna module thermal manager 216 can use the second antenna module 112 alone, the second antenna module 112 along with one or more other modules, or other antenna modules to the exclusion of the first and second antenna modules.

Figure 7:
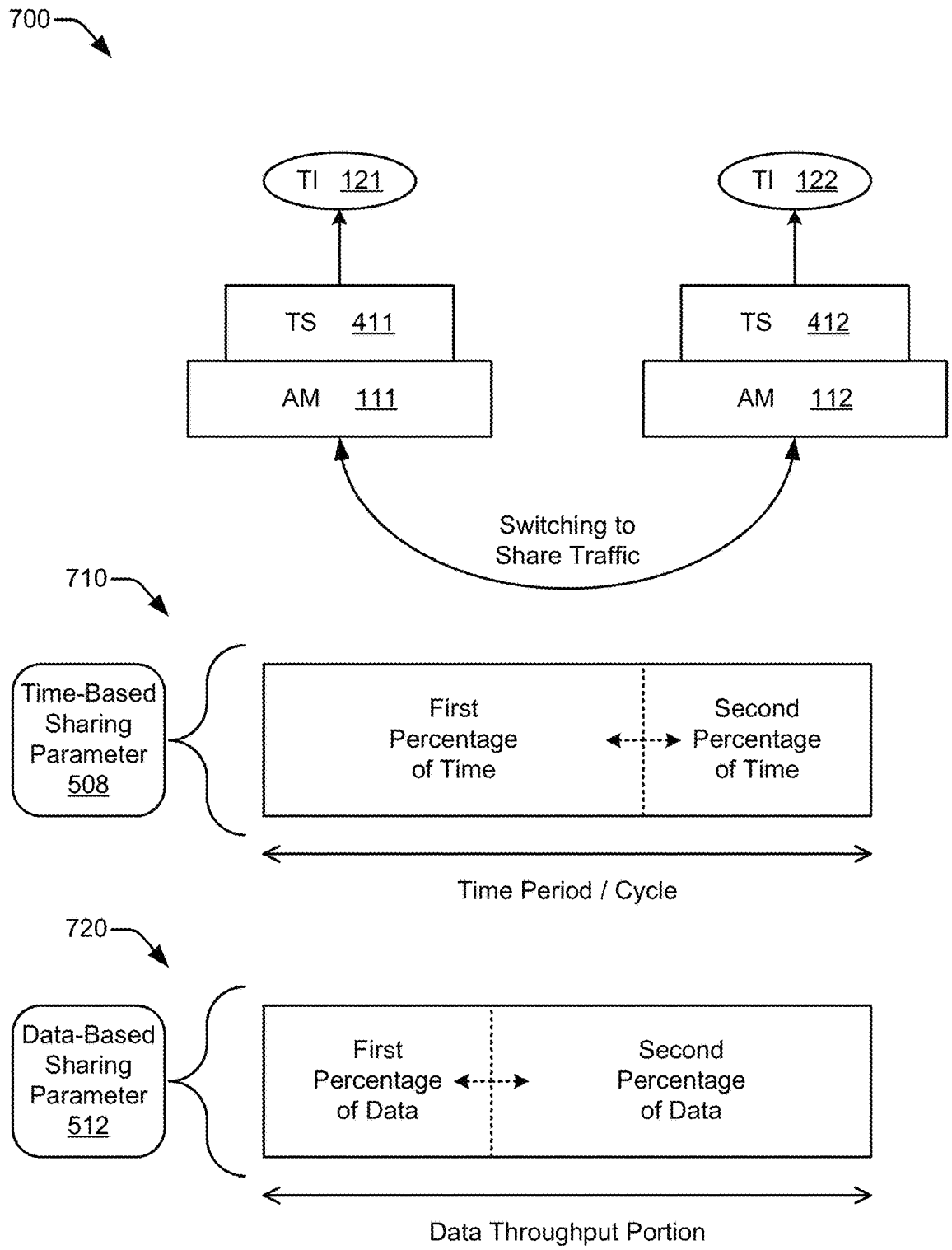
FIG. 7 depicts example traffic sharing techniques for thermal management with antenna modules.

FIG. 7 depicts example traffic sharing techniques 700 for thermal management with antenna modules. These traffic sharing techniques 700 cause the antenna modules to share communication traffic in a time-division manner (e.g., across time or at different times by alternating or rotating through the antenna modules). These traffic sharing techniques 700 include an example time-based sharing approach 710 and an example data-based sharing approach 720. For the time-based sharing approach 710, the antenna module thermal manager 216 (e.g., of FIGS. 4 and 5) switches between at least the first antenna module 111 and the second antenna module 112 in accordance with the time-based sharing parameter 508 (e.g., a duty cycle). The usage between the two antenna modules 111 and 112 is determined responsive to a first percentage of a time period corresponding to the first antenna module 111 and a second percentage of the time period corresponding to the second antenna module 112. The percentages of the time-based sharing parameter 508 can be adjusted responsive to the first temperature indication 121. With the adjusting, the antenna module thermal manager 216 can provide additional cooling time to the first antenna module 111 to attain or maintain a targeted temperature. A 50-50 duty cycle can improve thermal performance by two times (2×). With sharing between four antenna modules 111, 112, 113, and 114 using a 25-25-35-15 duty cycle, respectively, thermal performance for the first antenna module 111 can be improved by four times (4×).

For the data-based sharing approach 720, the antenna module thermal manager 216 switches between at least the first antenna module 111 and the second antenna module 112 in accordance with the data-based sharing parameter 512 (e.g., as a percentage of data throughput). The usage between the two antenna modules 111 and 112 is determined responsive to a first percentage of a data throughput portion corresponding to the first antenna module 111 and a second percentage of the data throughput portion corresponding to the second antenna module 112. The percentages can be adjusted to give the first antenna module 111 additional cooling time to attain or maintain a targeted temperature. For example, offered traffic can be split between two antenna modules as a fraction of the offered load. The percentage can start at one ratio (e.g., 50-50 or 10-90), and the antenna module thermal manager 216 can adjust the percentage ratio until a hotter module is operating below a thermal limit or a temperature indication 120 thereof is stabilized at some acceptable level. Although FIG. 7 is described in terms of switching between two antenna modules 111 and 112, temperature remediation processes 550 (e.g., with regard to the techniques depicted in FIGS. 7-9) can entail switching between more than two antenna modules, including between three antenna modules, between two pairs of antenna modules, and so forth.

Figure 8:
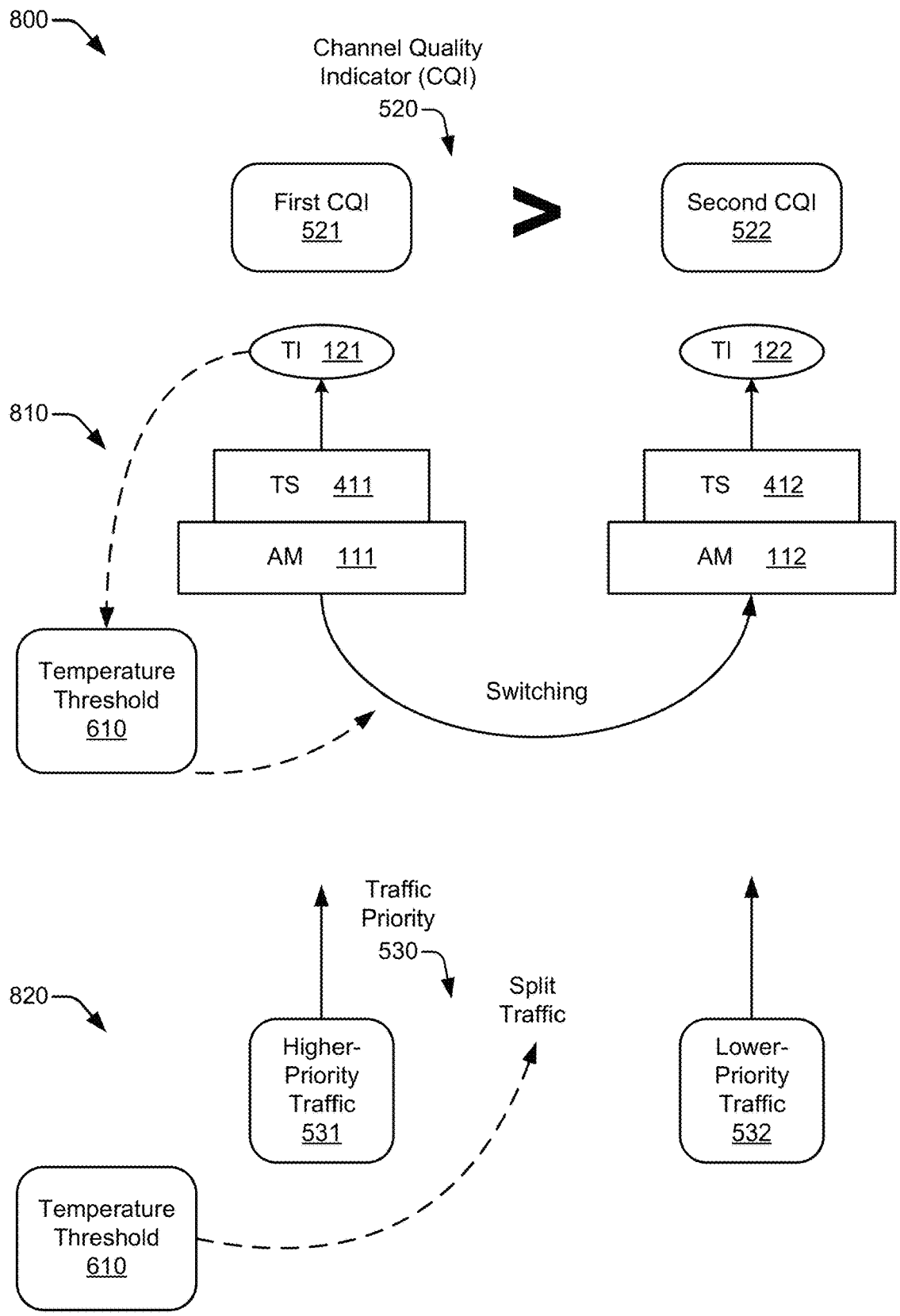
FIG. 8 depicts example signal-quality-based techniques for thermal management with antenna modules.

FIG. 8 depicts example signal-quality-based techniques 800 for thermal management with antenna modules. These signal-quality-based techniques 800 to moderate a temperature of an antenna module 110 include an example "greedy" approach 810 and an example priority-based approach 820. For the greedy approach 810, the antenna module thermal manager 216 switches from using the first antenna module 111 to using the second antenna module 112 for wireless communication to enable the first antenna module 111 to cool based on at least one channel quality indicator 520. Examples of a channel quality indicator 520 include SNR, error rate, average throughput, coding rate, and so forth. In operation, the antenna module thermal manager 216 determines that the first antenna module 111 is associated with a first channel quality indicator 521 that is greater than a second channel quality indicator 522 associated with the second antenna module 112. Responsive to this determination, the antenna module thermal manager 216 uses the first antenna module 111 for wireless communication until the first temperature indication 121 meets at least one temperature threshold 610.

Responsive to the first temperature indication 121 meeting the at least one temperature threshold 610, the antenna module thermal manager 216 switches from using the first antenna module 111 to using the second antenna module 112 for wireless communication to enable the first antenna module 111 to cool. For example, the antenna module thermal manager 216 can use an antenna module 110 with a higher or highest SNR until a thermal limit (e.g., a first temperature threshold 611) is reached. Responsive to this occurring, the antenna module thermal manager 216 switches to an antenna module with the next highest SNR for a given time period. After the time period elapses, the antenna module thermal manager 216 can switch back to the antenna module with the highest SNR. The overheating antenna module can be provided, for instance, 100-millisecond breaks. The break time can be adjusted such that the overheating antenna module does not reach a second temperature threshold 612 during its "on" cycle.

For the priority-based approach 820, the antenna module thermal manager 216 splits traffic between at least two antenna modules. This traffic splitting can be enacted after an antenna module 110 reaches at least one temperature threshold 610. Traffic priorities 530 can include at least higher-priority traffic 531 and lower-priority traffic 532, with the higher and lower being relative to one another. Generally, the higher-priority traffic 531 can be allocated to the antenna module 110 with the higher channel quality indicator 520. Initially, a first antenna module 111 can be transmitting and receiving both the higher-priority traffic and the lower-priority traffic for a given wireless communication. First, the antenna module thermal manager 216 determines that the first antenna module 111 is associated with a first channel quality indicator 521 that is greater than a second channel quality indicator 522 associated with a second antenna module 112.

Responsive to the determination, the antenna module thermal manager 216 continues to use the first antenna module 111 for traffic of the wireless communication with a relatively-higher priority—the higher-priority traffic 531—so that the traffic with the relatively-higher priority can benefit from the superior channel quality. Responsive to this determination and based on a comparison of the first temperature indication 121 to the temperature threshold 610, the antenna module thermal manager 216 switches from using the first antenna module 111 to using the second antenna module 112 for traffic of the wireless communication with a relatively-lower priority—the lower-priority traffic 532. In other words, during a first operational mode 621, the first antenna module 111 is allocated both lower- and higher-priority traffic due to the greater first channel quality indicator 521. During a second operational mode 622, however, the first antenna module 111 continues to be allocated the relatively-higher priority traffic, but the second antenna module 112 begins to be allocated the relatively-lower-priority traffic to help the first antenna module 111 to cool sufficiently to be able to continue handling the relatively-higher-priority traffic without reaching a third operational mode 623.

Alternatively, the traffic splitting that is based on priority can commence prior to a temperature indication 120 reaching a temperature threshold 610. Thus, in these manners, temperatures or temperature increases can be moderated by splitting the traffic between two or more antenna modules 110 with the higher-priority traffic 531, such as low-latency packets, being allocated to an antenna module 110 with at least a higher channel quality indicator 520. Although described with reference to approaches that utilize channel quality indicators 520, the priority-based approach can also be implemented separately from or without implementing a channel-quality-based approach.

Figure 9:
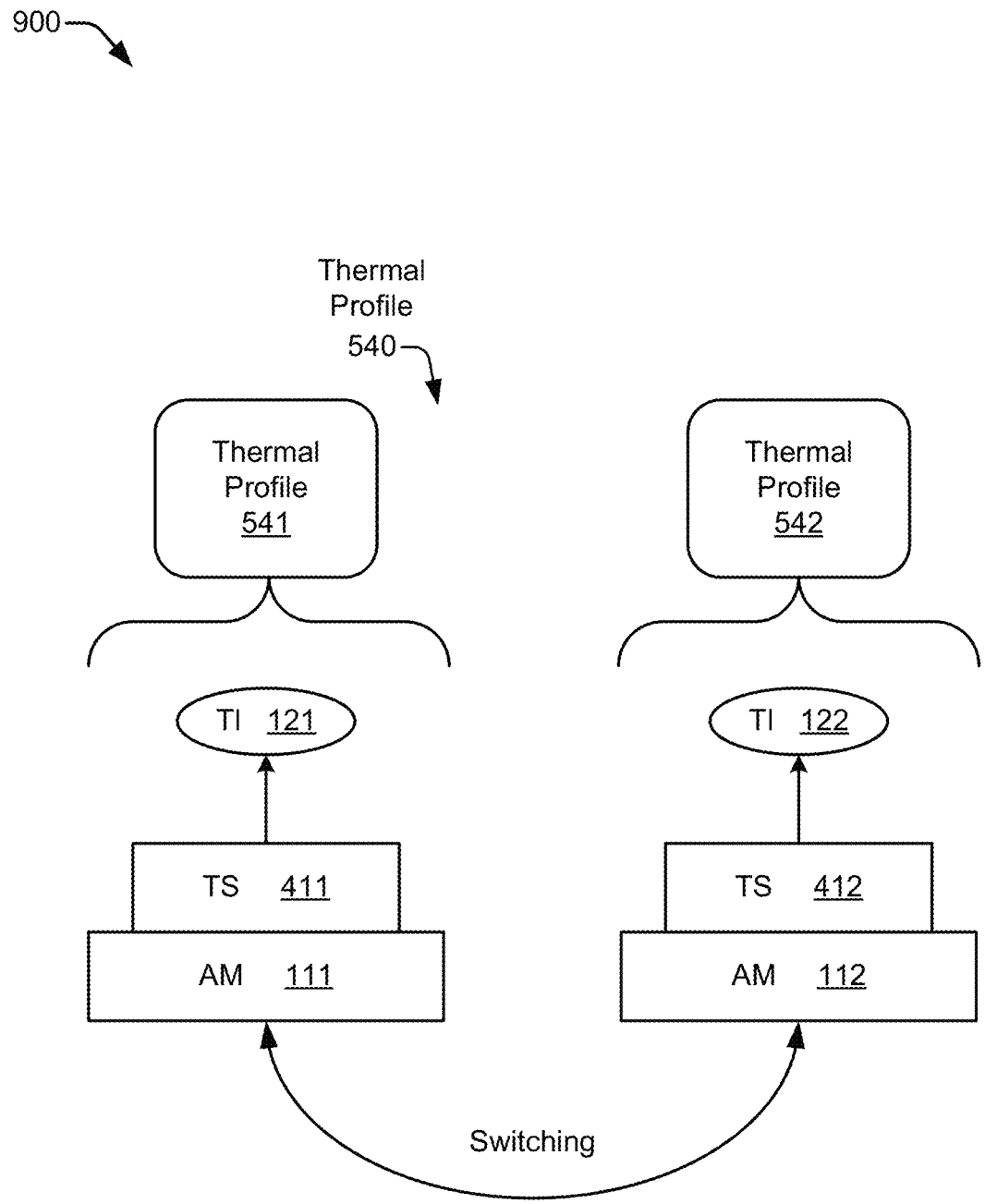
FIG. 9 depicts example alternative techniques for thermal management with antenna modules, including using a thermal profile of an antenna module.

FIG. 9 depicts example alternative techniques 900 for thermal management with antenna modules, including using a thermal profile 540 of an antenna module 110. With thermal-profile-based techniques, the antenna module thermal manager 216 determines multiple thermal profiles, with each thermal profile 540 respectively corresponding to an antenna module 110. For example, the antenna module thermal manager 216 can determine a first thermal profile 541 corresponding to a first antenna module 111 and a second thermal profile 542 corresponding to a second antenna module 112. Each thermal profile 540 is indicative of a rate of at least one of heating or cooling of the corresponding antenna module 110. The thermal profile 540 can be computed over any time period, such as a few milliseconds or tens of seconds.

The rate of heat generation or dissipation of a given antenna module can be affected by proximate components that may be functioning as a heat source 320 (of FIG. 3), by a presence of a heat sink, or by individual physical characteristics of the antenna module, as well as by utilization of the antenna module for wireless communication. Based on the multiple thermal profiles 541 and 542, the antenna module thermal manager 216 switches between two or more of the multiple antenna modules 111-115, including the first antenna module 111 and the second antenna module 112. Thus, the antenna module thermal manager 216 can select an antenna module based on the thermal performance by prioritizing the antenna module that has faster cooling or that is farther from other heat-generating components.

Generally, a signaling condition or capability of an antenna module depends on a physical position of the antenna module 110 in the UE, a location or orientation of the UE, and the surrounding environment. To increase a likelihood that two antenna modules are available for sharing with respect to time or data throughput, are available for switching or splitting traffic based on channel quality, or are available for utilizing thermal profiles, a UE can have multiple antenna modules positioned to have similar fields of view. For example, two antenna modules may be positioned on a same side of a housing or side-by-side along a frame of a UE. With reference to FIG. 4, the fourth and fifth antenna modules 114 and 115 may have a similar field of view based on a first physical position of the fourth antenna module 114 relative to a second physical position of the fifth antenna module 115. This positioning arrangement may be duplicated along different sides or at various areas of a UE 102 to produce multiple sets of two or more antenna modules having similar fields of view for executing one or more temperature remediation processes 550.

Figure 10:
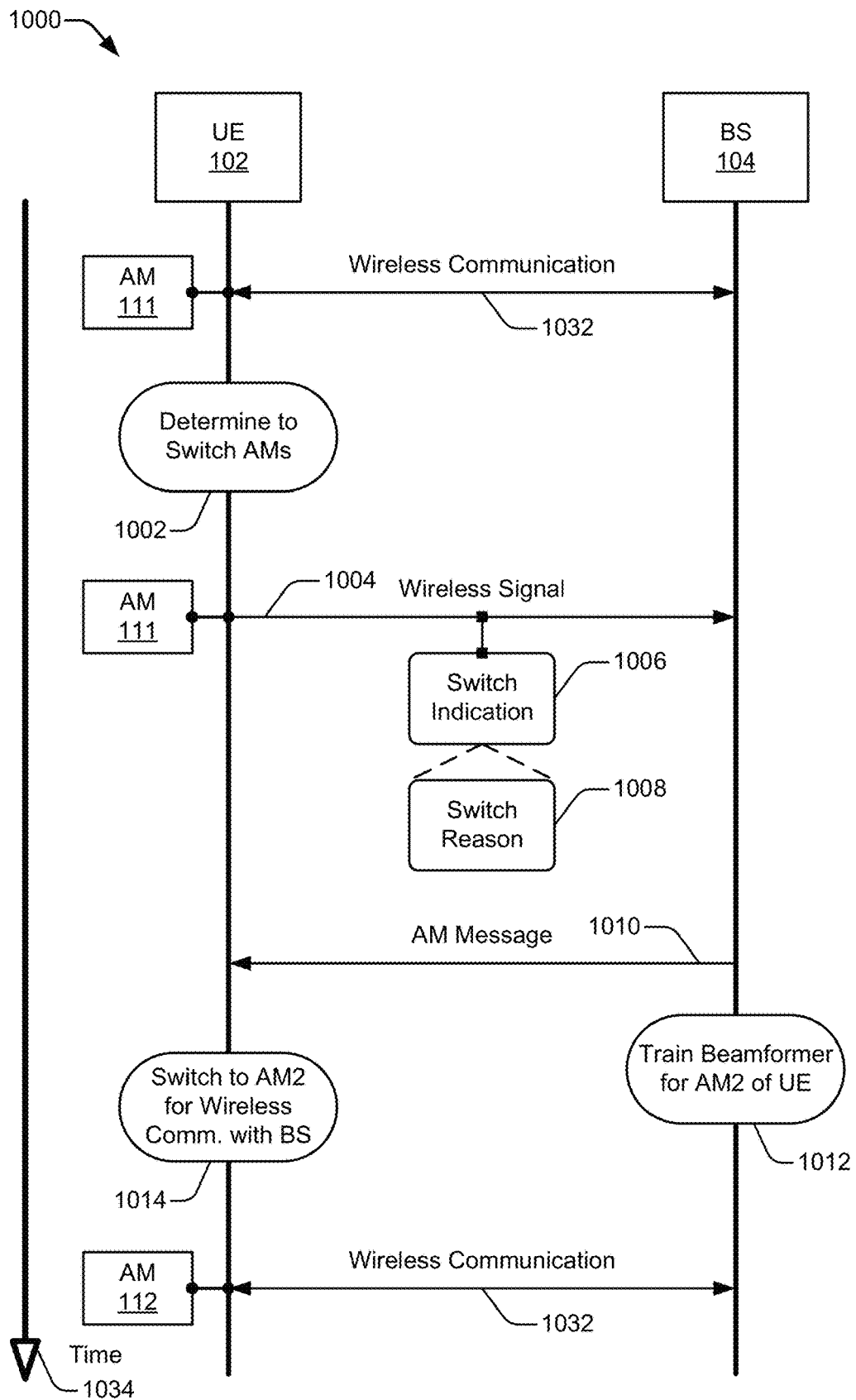
FIG. 10 is a sequence diagram illustrating examples of operations and communications between a UE and a BS for thermal management with antenna modules in accordance with a wireless signaling protocol.

FIG. 10 is a sequence diagram 1000 illustrating examples of operations and communications between a UE 102 and a BS 104 for thermal management with antenna modules in accordance with a wireless signaling protocol. The operations or communications can be performed at least partially by an antenna module thermal manager 216 (as shown in FIGS. 2, 4, and 5) of the UE 102 or by an antenna module thermal manager 266 (of FIG. 2) of the BS 104. In the example sequence diagram 1000, time 1034 increases in a downward direction. However, the arrow for the time 1034 is not necessarily depicted to scale relative to the occurrences of the operations and communications.

In example implementations, the UE 102 and the BS 104 are initially communicating at least via a first antenna module 111 (AM 111) of the UE 102 as indicated by wireless communication 1032. At 1002, the UE 102 determines to switch antenna modules. For instance, the antenna module thermal manager 216 may ascertain that a first antenna module 111 is heating beyond a first temperature threshold 611 and that a second antenna module 112 can be used instead for the wireless communication or can be used to share responsibilities of the wireless communication. The antenna module thermal manager 216 directs a wireless transceiver to transmit at least one wireless signal 1004 to the BS 104 using the first antenna module 111.

The at least one wireless signal 1004 is indicative of the switch from using the first antenna module 111 to using the second antenna module 112 for wireless communication with the BS 104. This switch indication 1006 can comprise, for example, a value or variable populating a field of a message or an identity or existence of the message itself. Further, the wireless signal 1004 can be indicative of a reason for the switch from using the first antenna module 111 to using the second antenna module 112 for wireless communication with the BS 104. This switch reason 1008 can be realized as, for example, a code included as part of the wireless signal 1004 or an identity or existence of the message generally or the switch indication 1006 in particular. Here, the switch reason 1008 relates to temperature management (e.g., a temperature alert or temperature moderation act), which can be contrasted with another reason such as channel quality, SAR level, object detection (e.g., a detected-object alert), and so forth.

The BS 104 receives the at least one wireless signal 1004. In response to receiving the wireless signal 1004, the BS 104 formulates an antenna module message 1010 (AM message 1010). If the wireless signal 1004 comprises a notification to the BS 104 of the switch, then the antenna module message 1010 can be realized as an acknowledgment message. On the other hand, if the wireless signal 1004 comprises a request to the BS 104 to make the switch, then the antenna module message 1010 can be realized as an approval message or a rejection message. The BS 104 transmits the antenna module message 1010 to the UE 102. The antenna module message 1010 can be communicated using a signal beam that is aimed at the first antenna module 111 or the second antenna module 112. At 1012, the BS 104 also trains a beamformer for communicating with the second antenna module 112 of the UE 102 using a signal beam. The beamformer training can be performed before or after transmission of the antenna module message 1010, such as in furtherance of regular beamformer training or in response to notification of an impending antenna module switch.

The UE 102 receives the antenna module message 1010 via the first or second antenna module 111 or 112. If the module switch is not already accomplished, and assuming the BS 104 did not block the antenna-module switching, the UE 102 switches from the first antenna module 111 to the second antenna module 112 (AM 112) for continuing wireless communication with the BS 104 at 1014. Thus, the UE 102 and the BS 104 can continue the wireless communication 1032 using the second antenna module 112 of the UE 102.

Having generally described schemes and techniques for antenna module thermal management, this discussion now turns to example methods.

Example Methods for Thermal Management with Antenna Modules

Example methods are described below with reference to various flow diagrams of FIGS. 11, 12, and 13. These methods relate to switching antenna modules at a UE, communicating about the switching from the perspective of the UE, and communicating about the switching from the perspective of the BS, respectively. Aspects of these methods may be implemented in, for example, hardware (e.g., fixed logic circuitry, a communication-oriented processor such as a modem, or an application or general-purpose processor in conjunction with a memory system), firmware, or some combination thereof. These processes may be realized using one or more of the wireless devices or components shown in FIGS. 1-10, which devices or components may be further divided, combined, and so on. The electronic devices and components of these figures generally represent firmware, hardware—such as user or server devices, packaged modules, IC chips, circuits, or a combination thereof. Thus, these figures illustrate some of the many possible systems or apparatuses capable of implementing the described methods.

For these flow diagrams, the orders in which operations are shown and/or described are not intended to be construed as a limitation. Any number or combination of the described method operations can be combined in any order to implement a given method, or an alternative method. Also, operations may be omitted or added to the described methods. Further, described operations can be implemented in fully or partially overlapping manners. Although the three flow diagrams are described separately, their operations may be interrelated. For example, if a UE 102 is described as transmitting a wireless signal 1004 with a particular payload or indication with respect to one flow diagram, a corresponding serving BS 104 can therefore be receiving the payload or indication with respect to another flow diagram.

Figure 11:
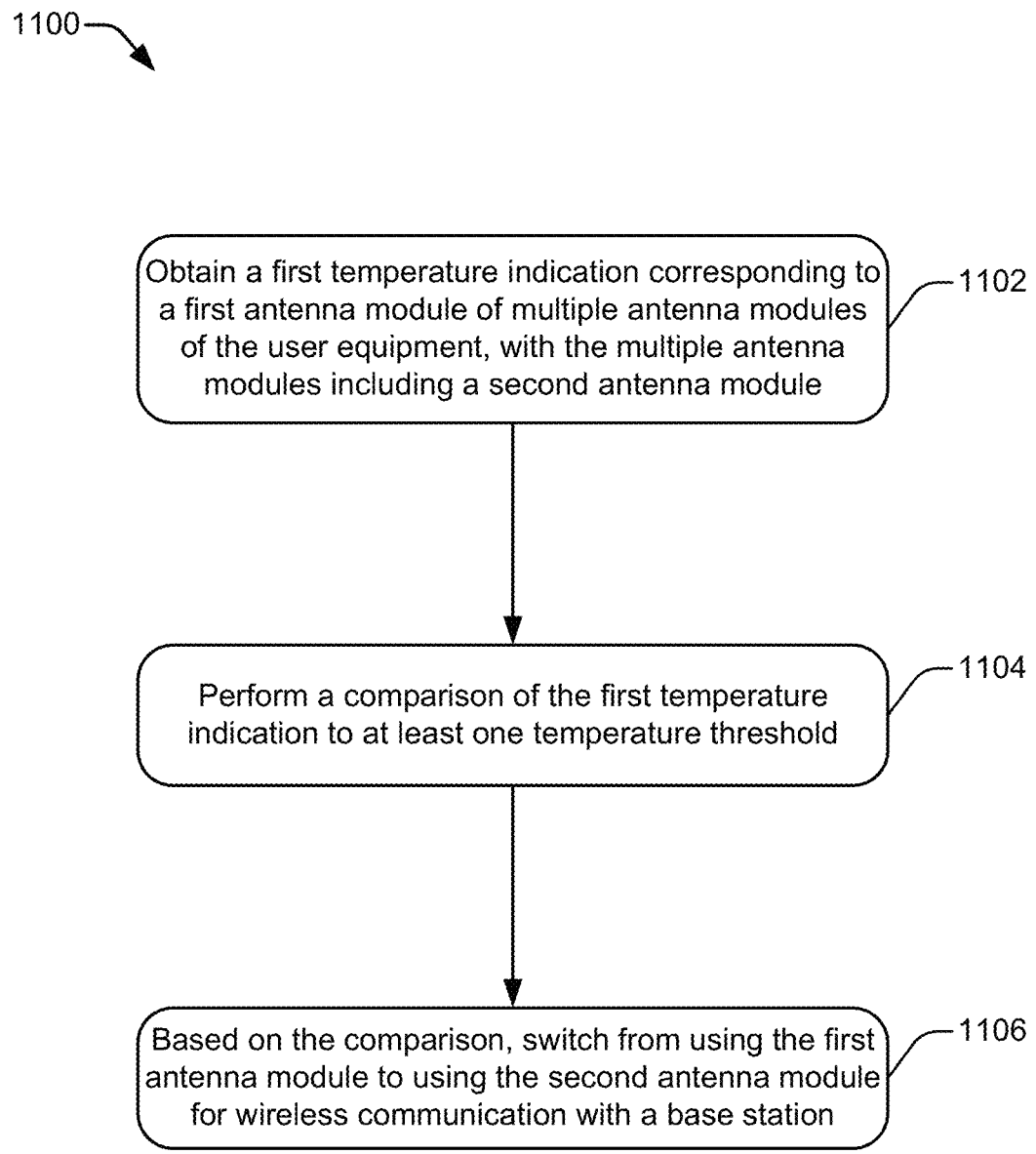
FIG. 11 illustrates example methods for a UE to implement thermal management with antenna modules.

FIG. 11 illustrates, with a flow diagram 1100, example methods by a user equipment 102 for thermal management with antenna modules. At 1102, a first temperature indication corresponding to a first antenna module of multiple antenna modules of the user equipment is obtained, with the multiple antenna modules including a second antenna module. For example, an antenna module thermal manager 216 can obtain a first temperature indication 121 corresponding to a first antenna module 111 of multiple antenna modules 111-115 of the user equipment 102, with the multiple antenna modules 111-115 including a second antenna module 112. In some cases, a first temperature sensor 411 may sense a temperature of the first antenna module 111 or may send a sensed temperature for the first antenna module 111 to the antenna module thermal manager 216 at a communication processor 302, such as a modem.

At 1104, a comparison is performed of the first temperature indication to at least one temperature threshold. For example, the antenna module thermal manager 216 can perform a comparison of the first temperature indication 121 to at least one temperature threshold 610. For instance, the antenna module thermal manager 216 may ascertain whether the first temperature indication 121 is below or above a first temperature threshold 611.

At 1106, based on the comparison, wireless communication with a base station is switched from using the first antenna module to using a second antenna module. For example, the antenna module thermal manager 216 can, based on the comparison, switch from using the first antenna module 111 to using the second antenna module 112 for wireless communication with a base station 104. To do so, the antenna module thermal manager 216 may direct a transceiver 206 or 208 to route at least some increased amount of wireless signaling of the wireless communication through the second antenna module 112 in accordance with a temperature remediation process 550 while the first antenna module 111 remains within a first operational mode 621.

Figure 12:
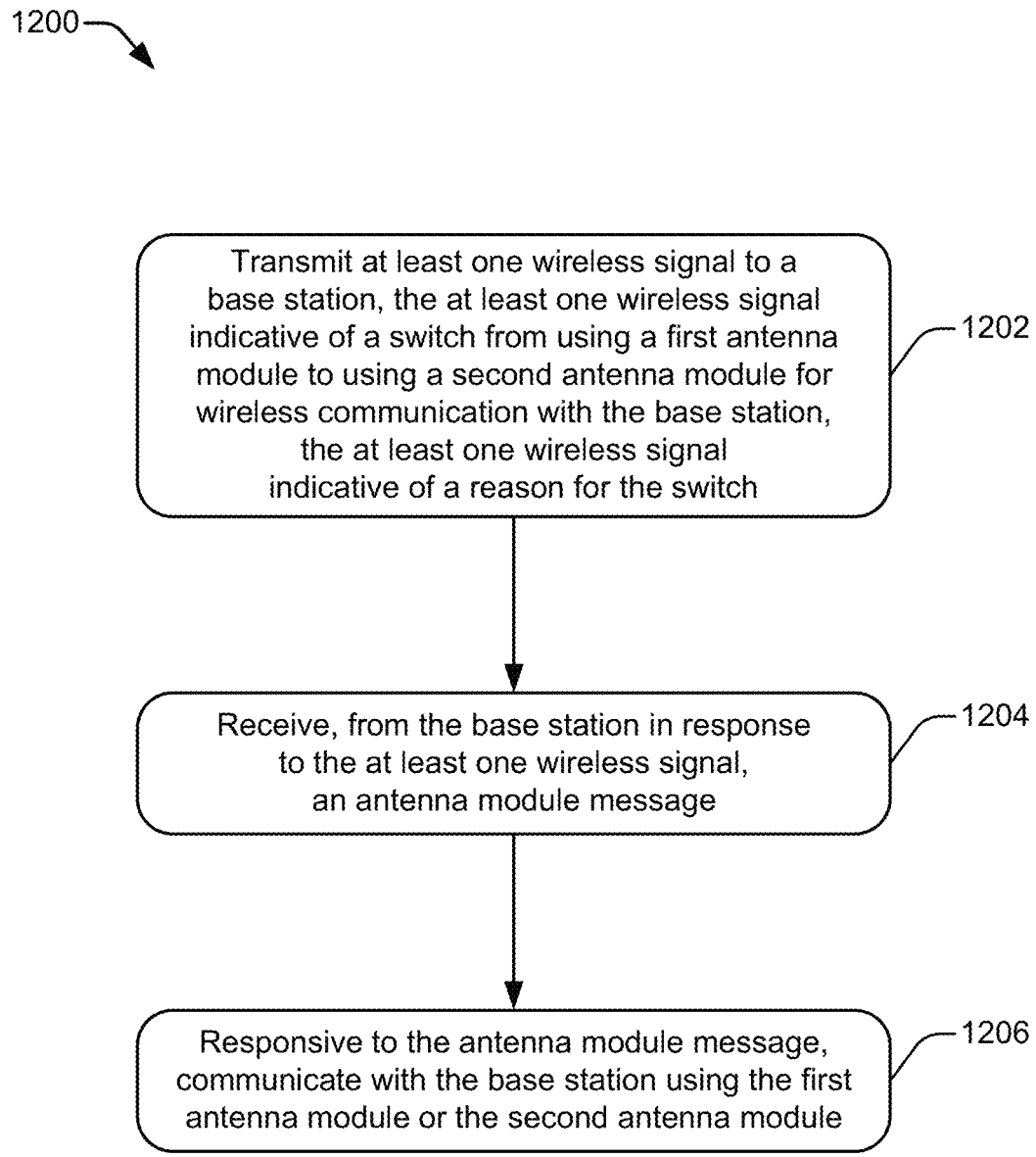
FIG. 12 illustrates other example methods for a UE to implement thermal management with antenna modules.

FIG. 12 illustrates, with a flow diagram 1200, example methods by a user equipment 102 to communicate with a base station 104 for thermal management with antenna modules. At 1202, at least one wireless signal is transmitted to a base station, with the at least one wireless signal indicative of a switch from using a first antenna module to using a second antenna module for wireless communication with the base station; the at least one wireless signal is also indicative of a reason for the switch. For example, the user equipment 102 can transmit at least one wireless signal 1004 to a base station 104, with the at least one wireless signal 1004 indicative of a switch from using a first antenna module 111 to using a second antenna module 112 for wireless communication with the base station 104. Here, the at least one wireless signal 1004 can also be indicative of a reason 1008 for the switch between the first and second antenna modules 111 and 112. In some cases, the user equipment 102 may transmit the wireless signal 1004 responsive to a determination to switch antenna modules to proactively manage thermals for at least one antenna module and in accordance with at least one wireless standard, such as a 5G NR standard released by the 3 GPP.

At 1204, in response to the at least one wireless signal, an antenna module message is received from the base station. For example, the user equipment 102 can receive from the base station 104 an antenna module message 1010 in response to the at least one wireless signal 1004. The user equipment 102 may receive the antenna module message 1010 via the first or the second antenna module 111 or 112. The antenna module message 1010 may authorize the switching of antenna modules or provide a time for the switch to occur.

At 1206, responsive to the antenna module message, a communication is made with the base station using the first antenna module or the second antenna module. For example, responsive to the antenna module message 1010, the user equipment 102 can communicate with the base station 104 using the first antenna module 111 or the second antenna module 112. For instance, if the switch is authorized by the antenna module message 1010, the user equipment 102 may communicate with the base station 104 using the second antenna module 112. Otherwise, the user equipment 102 may continue to communicate with the base station 104 using the first antenna module 111.

Figure 13:
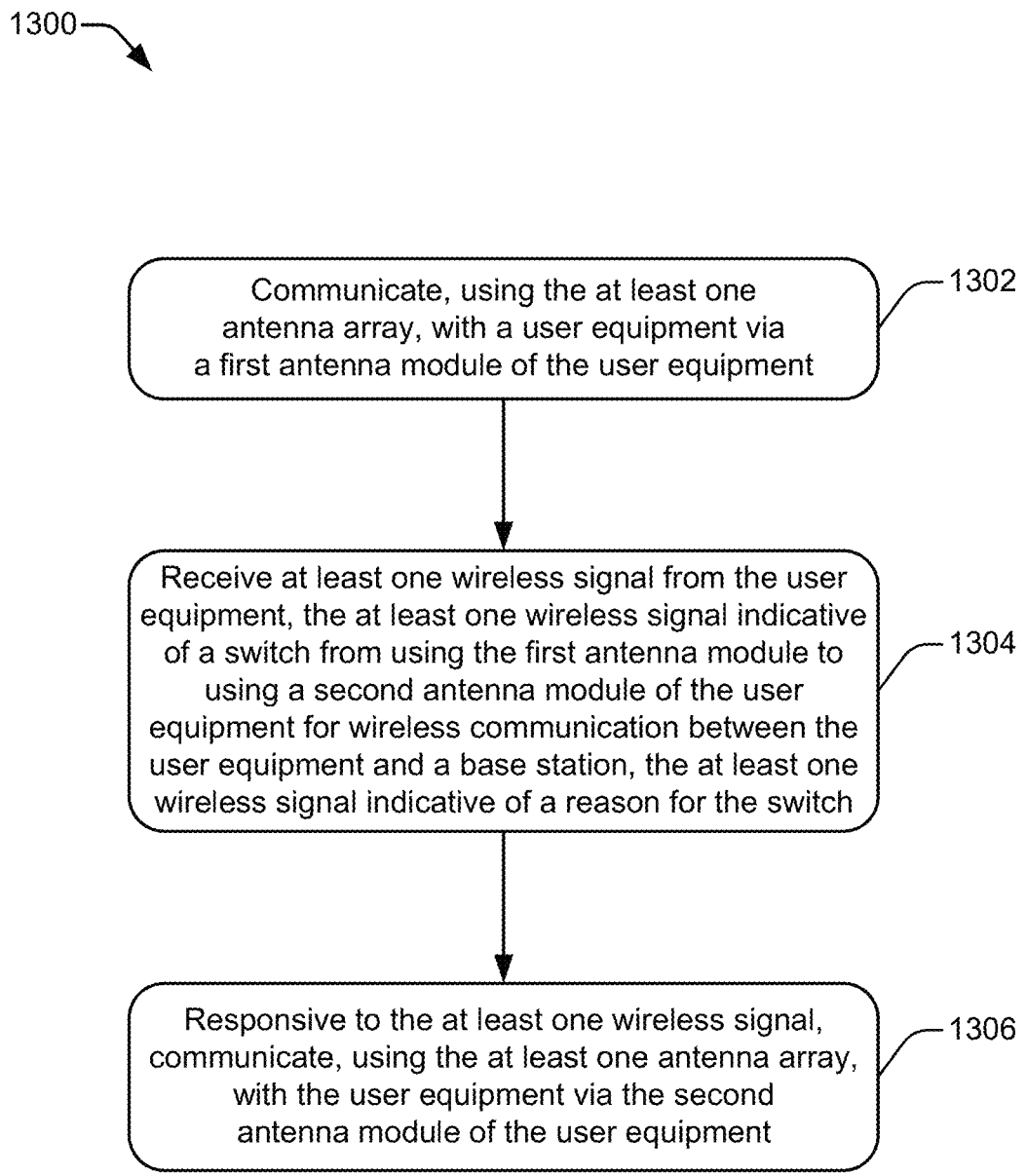
FIG. 13 illustrates example methods for a BS to implement thermal management with antenna modules.

FIG. 13 illustrates, with a flow diagram 1300, example methods by a base station 104 to communicate with a user equipment 102 for thermal management with antenna modules. At 1302, a communication is made with a user equipment via a first antenna module of the user equipment. For example, the base station 104 can communicate with a user equipment 102 via a first antenna module 111 of the user equipment 102. For instance, the base station 104 may aim a signal beam at the first antenna module 111 of the user equipment 102 for a wireless communication 1032.

At 1304, at least one wireless signal is received from the user equipment, with the at least one wireless signal indicative of a switch from using the first antenna module to using a second antenna module of the user equipment for wireless communication between the user equipment and the base station; the at least one wireless signal is also indicative of a reason for the switch. For example, the base station 104 can receive at least one wireless signal 1004 from the user equipment 102, with the at least one wireless signal 1004 including an indication 1006 regarding switching from using the first antenna module 111 to using a second antenna module 112 of the user equipment 102 for the wireless communication 1032 between the user equipment 102 and the base station 104. Here, the at least one wireless signal 1004 can also be indicative of a reason 1008 for the switch between the first and second antenna modules 111 and 112. The switch indication 1006 may comprise a field of the wireless signal 1004 or the wireless signal 1004 itself, and the switch reason 1008 may correspond to antenna module thermal management. The wireless signal 1004, which may comprise a notification of or a request for an antenna module switch, may be communicated as part of control-plane signaling between the user equipment 102 and the base station 104.

At 1306, responsive to the at least one wireless signal, a communication is made with the user equipment via the second antenna module of the user equipment. For example, responsive to the at least one wireless signal 1004, the base station 104 can communicate with the user equipment 102 via the second antenna module 112 of the user equipment 102. To do so, the base station 104 may aim a signal beam at the second antenna module 112 of the user equipment 102 for the wireless communication 1032. Prior to or as part of this communication, the base station 104 may transmit an antenna module message 1010 to the user equipment 102 to authorize (e.g., acknowledge a notification of or approve a request for) an antenna module switch. Further, the base station 104 may train for a signal beam with the second antenna module 112 of the user equipment 102 prior to making the communication. Alternatively, the base station 104 can reject a request for an antenna module switch at the user equipment 102.

ADDITIONAL EXAMPLES

In the following, some examples are described.

Example 1: A user equipment comprising: multiple antenna modules including a first antenna module and a second antenna module; at least one wireless transceiver coupled to the multiple antenna modules; and a processor and memory system, coupled to the at least one wireless transceiver, implementing an antenna module thermal manager configured to: obtain a first temperature indication corresponding to the first antenna module of the multiple antenna modules; perform a comparison of the first temperature indication to at least one temperature threshold; and based on the comparison, switch from using the first antenna module to using the second antenna module for wireless communication with the at least one wireless transceiver.

Example 2: The user equipment of example 1, wherein the first antenna module comprises: an amplifier; and an antenna array coupled to the amplifier, the antenna array including multiple antenna elements, wherein the amplifier comprises at least one of a power amplifier or a low-noise amplifier.

Example 3: The user equipment of example 2 or 3, wherein the first antenna module comprises: at least one phase shifter coupled to the antenna array; and a temperature sensor configured to determine the first temperature indication corresponding to the first antenna module.

Example 4: The user equipment of any of the preceding examples, wherein the antenna module thermal manager is further configured to: responsive to the comparison, execute at least one temperature remediation process to moderate the first temperature indication corresponding to the first antenna module of the multiple antenna modules.

Example 5: The user equipment of any of the preceding examples, wherein: the at least one temperature threshold comprises a first temperature threshold and a second temperature threshold; and the antenna module thermal manager is further configured to: perform the comparison of the first temperature indication to the first temperature threshold; based on the comparison, switch from using the first antenna module to using the second antenna module for the wireless communication in accordance with the at least one temperature remediation process; perform another comparison of the first temperature indication to the second temperature threshold; and based on the other comparison, cease using the first antenna module for the wireless communication.

Example 6: The user equipment of any of the preceding examples, wherein the antenna module thermal manager is further configured to execute the at least one temperature remediation process to moderate the first temperature indication by: sharing traffic of the wireless communication between two or more antenna modules in a time-division manner in accordance with at least one time-based sharing parameter, the two or more antenna modules including the first antenna module and the second antenna module; and adjusting the at least one time-based sharing parameter responsive to the first temperature indication.

Example 7: The user equipment of any of the preceding examples, wherein the antenna module thermal manager is further configured to execute the at least one temperature remediation process to moderate the first temperature indication by: sharing traffic of the wireless communication between two or more antenna modules in a time-division manner in accordance with at least one data-based sharing parameter, the two or more antenna modules including the first antenna module and the second antenna module; and adjusting the at least one data-based sharing parameter responsive to the first temperature indication.

Example 8: The user equipment of any of the preceding examples, wherein the antenna module thermal manager is further configured to execute the at least one temperature remediation process to moderate the first temperature indication by: determining that the first antenna module is associated with a first channel quality indicator that is greater than a second channel quality indicator associated with the second antenna module; and responsive to the determining, using the first antenna module for the wireless communication until the first temperature indication meets the at least one temperature threshold, wherein the switch from using the first antenna module to using the second antenna module for the wireless communication is performed responsive to the first temperature indication that corresponds to the first antenna module meeting the at least one temperature threshold to enable the first antenna module to cool.

Example 9: The user equipment of any of the preceding examples, wherein the antenna module thermal manager is further configured to execute the at least one temperature remediation process to moderate the first temperature indication by: determining that the first antenna module is associated with a first channel quality indicator that is greater than a second channel quality indicator associated with the second antenna module; and responsive to the determining, using the first antenna module for traffic of the wireless communication with a relatively-higher priority; and based on the comparison, switching from using the first antenna module to using the second antenna module for traffic of the wireless communication with a relatively-lower priority.

Example 10: The user equipment of any of the preceding examples, wherein the antenna module thermal manager is further configured to execute the at least one temperature remediation process to moderate the first temperature indication by: determining multiple thermal profiles, each thermal profile of the multiple thermal profiles respectively corresponding to an antenna module of the multiple antenna modules, each thermal profile indicative of a rate of at least one of heating or cooling of the corresponding antenna module; and based on the multiple thermal profiles, switching between two or more of the multiple antenna modules including the first antenna module and the second antenna module.

Example 11: The user equipment of any of the preceding examples, wherein the antenna module thermal manager is further configured to: execute the at least one temperature remediation process based on a first physical position of the first antenna module relative to a second physical position of the second antenna module.

Example 12: The user equipment of any of the preceding examples, further comprising: at least one object detector configured to detect an object relative to an individual antenna module of the multiple antenna modules, wherein the antenna module thermal manager is further configured to execute the at least one temperature remediation process to moderate the first temperature indication by switching away from using the first antenna module for the wireless communication responsive to detection of the object relative to the first antenna module or by switching to using the first antenna module for the wireless communication responsive to detection of the object relative to the second antenna module.

Example 13: The user equipment of any of the preceding examples, wherein the antenna module thermal manager is further configured to: direct the at least one wireless transceiver to transmit at least one wireless signal to a base station, the at least one wireless signal indicative of the switch from using the first antenna module to using the second antenna module for wireless communication with the base station.

Example 14: The user equipment of any of the preceding examples, wherein the at least one wireless signal is indicative of a reason for the switch from using the first antenna module to using the second antenna module for wireless communication with the base station.

Example 15: A method by a user equipment for thermal management with antenna modules, the method comprising: obtaining a first temperature indication corresponding to a first antenna module of multiple antenna modules of the user equipment, the multiple antenna modules comprising a second antenna module; performing a comparison of the first temperature indication to at least one temperature threshold; and based on the comparison, switching from using the first antenna module to using the second antenna module for wireless communication with a base station.

Example 16: The method of example 15, further comprising: responsive to the comparison, executing at least one temperature remediation process to moderate the first temperature indication corresponding to the first antenna module of the multiple antenna modules.

Example 17: The method of example 15 or 16, further comprising: transmitting at least one wireless signal to the base station, the at least one wireless signal indicative of the switching from using the first antenna module to using the second antenna module for the wireless communication with the base station and indicative of a reason for the switching.

Example 18: A base station comprising: at least one antenna array; one or more wireless transceivers coupled to the at least one antenna array; and a processor and memory system, coupled to the one or more wireless transceivers, implementing an antenna module thermal manager configured to direct the one or more wireless transceivers to: communicate, using the at least one antenna array, with a user equipment via a first antenna module of the user equipment; receive at least one wireless signal from the user equipment, the at least one wireless signal indicative of a switch from using the first antenna module to using a second antenna module of the user equipment for wireless communication between the user equipment and the base station, the at least one wireless signal indicative of a reason for the switch; and responsive to the at least one wireless signal, communicate, using the at least one antenna array, with the user equipment via the second antenna module of the user equipment.

Example 19: The base station of example 18, wherein: the reason for the switch comprises temperature management; and the antenna module thermal manager is further configured to direct the one or more wireless transceivers to transmit an antenna module message based on the second antenna module and the reason for the switch.

Example 20: The base station of example 18 or 19, wherein: the at least one wireless signal comprises a request to switch from using the first antenna module of the user equipment to using the second antenna module of the user equipment for the wireless communication between the user equipment and the base station; and the antenna module message comprises an approval message for the request or a rejection message for the request.

Example 21: A computer program product comprising instructions which, when executed by one or more processors, cause the one or more processors to perform the method of any of examples 15 to 17.

Example 22: A user equipment configured to perform the method of any of examples 15 to 17.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for thermal management for antenna modules have been described in language specific to certain features and/or methods, the subject of the appended claims is not necessarily limited to the specific features or methods described. Rather, the specific features and methods are disclosed as example implementations for thermal management for antenna modules.

What is claimed is:

1. A user equipment comprising:
multiple antenna modules including a first antenna module and a second antenna module;
at least one wireless transceiver coupled to the multiple antenna modules; and
a processor and memory system, coupled to the at least one wireless transceiver, implementing an antenna module thermal manager configured to:
obtain a first temperature indication corresponding to the first antenna module of the multiple antenna modules;
perform a comparison of the first temperature indication to at least one temperature threshold; and
responsive to the comparison, execute at least one temperature remediation process to moderate the first temperature indication corresponding to the first antenna module of the multiple antenna modules, the at least one temperature remediation processes including:
sharing traffic of wireless communication of the user equipment between two or more of the multiple antenna modules in a time-division sharing scheme in accordance with a time-based sharing parameter, the two or more antenna modules including the first antenna module and the second antenna module, and adjusting the time-based sharing parameter of the time-division sharing scheme responsive to the first temperature indication such that a first portion of the traffic is communicated using the first antenna module for a first non-zero percentage of a communication duty cycle of the time-division sharing scheme and a second portion of the traffic is communicated using the second antenna module for a second non-zero percentage of the communication duty cycle of the time-division sharing scheme.

2. The user equipment of claim 1, wherein the first antenna module comprises:
an amplifier; and
an antenna array coupled to the amplifier, the antenna array including multiple antenna elements,
wherein the amplifier comprises at least one of a power amplifier or a low-noise amplifier.

3. The user equipment of claim 2, wherein the first antenna module comprises:
at least one phase shifter coupled to the antenna array; and
a temperature sensor configured to determine the first temperature indication corresponding to the first antenna module.

4. The user equipment of claim 1, wherein:
the at least one temperature threshold comprises a second temperature threshold and a third temperature threshold; and
the antenna module thermal manager is further configured to:
perform the comparison of the first temperature indication to the second temperature threshold;
based on the comparison, switch from using the first antenna module to using the second antenna module for the wireless communication in accordance with the at least one temperature remediation process;
perform another comparison of the first temperature indication to the third temperature threshold; and
based on the other comparison, cease using the first antenna module for the wireless communication.

5. The user equipment of claim 1, wherein the antenna module thermal manager is further configured to execute the at least one temperature remediation process to moderate the first temperature indication by:
sharing the traffic of the wireless communication between two or more antenna modules in a data-sharing manner in accordance with at least one data-based sharing parameter, the two or more antenna modules including the first antenna module and the second antenna module; and
adjusting the at least one data-based sharing parameter responsive to the first temperature indication.

6. The user equipment of claim 1, wherein the antenna module thermal manager is further configured to execute the at least one temperature remediation process to moderate the first temperature indication by:
determining that the first antenna module is associated with a first channel quality indicator that is greater than a second channel quality indicator associated with the second antenna module; and
responsive to the determining, using the first antenna module for the wireless communication until the first temperature indication meets the at least one temperature threshold,
wherein the sharing of the traffic between the first antenna module and the second antenna module for the wireless communication is performed responsive to the first temperature indication that corresponds to the first antenna module meeting the at least one temperature threshold to enable the first antenna module to cool.

7. The user equipment of claim 1, wherein the antenna module thermal manager is further configured to execute the at least one temperature remediation process to moderate the first temperature indication by:
determining that the first antenna module is associated with a first channel quality indicator that is greater than a second channel quality indicator associated with the second antenna module; and
responsive to the determining, splitting the traffic of the wireless communication by:
using the first antenna module for traffic of the wireless communication with a relatively-higher priority; and
using the second antenna module for traffic of the wireless communication with a relatively-lower priority.

8. The user equipment of claim 1, wherein the antenna module thermal manager is further configured to execute the at least one temperature remediation process to moderate the first temperature indication by:
determining multiple thermal profiles, each thermal profile of the multiple thermal profiles respectively corresponding to an antenna module of the multiple antenna modules, each thermal profile indicative of a rate of at least one of heating or cooling of the corresponding antenna module; and
based on the multiple thermal profiles, implement the sharing of the traffic between two or more of the multiple antenna modules including the first antenna module and the second antenna module.

9. The user equipment of claim 1, wherein the antenna module thermal manager is further configured to:

execute the at least one temperature remediation process based on a first physical position of the first antenna module relative to a second physical position of the second antenna module.

10. The user equipment of claim 1, further comprising:
at least one object detector configured to detect an object relative to an individual antenna module of the multiple antenna modules, and
wherein the antenna module thermal manager is further configured to execute another temperature remediation process to moderate the first temperature indication by switching away from using the first antenna module for the wireless communication responsive to detection of the object relative to the first antenna module or by switching to using the first antenna module for the wireless communication responsive to detection of the object relative to the second antenna module.

11. The user equipment of claim 1, wherein the antenna module thermal manager is further configured to:
direct the at least one wireless transceiver to transmit at least one wireless signal to a base station, the at least one wireless signal indicative of the sharing of the traffic between the first antenna module and the second antenna module for wireless communication with the base station.

12. The user equipment of claim 11, wherein the at least one wireless signal is indicative of a reason for the sharing of the traffic between the first antenna module and the second antenna module for wireless communication with the base station.

13. The user equipment of claim 1, wherein the time-based sharing parameter specifies the first percentage of the communication duty cycle to use the first antenna module to communicate the first portion of the traffic and the second non-zero percentage of the communication duty cycle to use the second antenna module to communicate the second respective portion of the traffic.

14. The user equipment of claim 1, wherein the time-based sharing parameter comprises a duty cycle value that specifies sharing the traffic between:
the first antenna module for at least 25 percent of the communication duty cycle or a time period of communication; and
the second antenna module for at least 25 percent of the communication duty cycle or the time period of communication.

15. The user equipment of claim 1, wherein the time-based sharing parameter comprises a duty cycle value that specifies sharing the traffic between:
the first antenna module for up to 50 percent of the communication duty cycle or a time period of communication; and
the second antenna module for up to 50 percent of the communication duty cycle or the time period of communication.

16. A method by a user equipment for thermal management with antenna modules, the method comprising:
obtaining a first temperature indication corresponding to a first antenna module of multiple antenna modules of the user equipment, the multiple antenna modules comprising the first antenna module and a second antenna module;
performing a comparison of the first temperature indication to at least one temperature threshold; and
based on the comparison,
sharing traffic of wireless communication of the user equipment between at least the first antenna module and the second antenna module of the multiple antenna modules in a time-division sharing scheme in accordance with a time-based sharing parameter, and adjusting the time-based sharing parameter of the time-division sharing scheme responsive to the first temperature indication such that a first portion of the traffic is communicated using the first antenna module for a first non-zero percentage of a communication duty cycle of the time-division sharing scheme and a second portion of the traffic is communicated using the second antenna module for a second non-zero percentage of the communication duty cycle of the time-division sharing scheme.

17. The method of claim 16, further comprising:
responsive to the comparison, executing at least one temperature remediation process to implement the sharing of the traffic of wireless communication to moderate the first temperature indication corresponding to the first antenna module of the multiple antenna modules.

18. The method of claim 17, further comprising:
transmitting at least one wireless signal to a base station, the at least one wireless signal indicative of the sharing of the traffic of wireless communication between the first antenna module and the second antenna module for the wireless communication with the base station and indicative of a reason for the sharing of the traffic.

19. The method of claim 16, wherein the time-based sharing parameter comprises a duty cycle value that specifies the first non-zero percentage of the communication duty cycle to use the first antenna module to communicate the first portion of the traffic and a second non-zero percentage of the communication duty cycle to use the second antenna module to communicate the second portion of the traffic.

20. The method of claim 19, wherein adjusting the time-based sharing parameter comprises altering the duty cycle value to change a ratio of the first non-zero percentage of time for which the first antenna module is used to the second non-zero percentage of time for which the second antenna module is used.

* * * * *